(12) United States Patent
Sawai

(10) Patent No.: US 8,381,887 B2
(45) Date of Patent: Feb. 26, 2013

(54) HYDRAULIC SHOCK ABSORBER

(75) Inventor: Seiji Sawai, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1064 days.

(21) Appl. No.: 12/066,129

(22) PCT Filed: Sep. 7, 2006

(86) PCT No.: PCT/JP2006/317776
§ 371 (c)(1),
(2), (4) Date: Mar. 7, 2008

(87) PCT Pub. No.: WO2007/029787
PCT Pub. Date: Mar. 15, 2007

(65) Prior Publication Data
US 2009/0101459 A1    Apr. 23, 2009

(30) Foreign Application Priority Data
Sep. 9, 2005    (JP) ................................. 2005-262224

(51) Int. Cl.
*F16F 9/00*    (2006.01)
(52) U.S. Cl. .................................... 188/317; 188/282.5
(58) Field of Classification Search .................. 188/280,
188/282.1, 282.5, 282.6, 283, 285, 304, 308,
188/309, 313, 316, 317, 322.12, 322.15,
188/322.22
See application file for complete search history.

(56) References Cited

U.S. PATENT DOCUMENTS

| | | | | |
|---|---|---|---|---|
| 2,740,500 A | * | 4/1956 | Brundrett et al. | 188/282.5 |
| 3,134,460 A | * | 5/1964 | Bourcier De Carbon | 188/317 |
| 4,106,596 A | * | 8/1978 | Hausmann | 188/314 |
| 4,588,053 A | * | 5/1986 | Foster | 188/275 |
| 4,634,543 A | * | 1/1987 | Okada et al. | 252/78.5 |
| 4,671,392 A | * | 6/1987 | Wossner | 188/266.3 |
| 5,248,014 A | * | 9/1993 | Ashiba | 188/282.8 |
| 5,372,224 A | * | 12/1994 | Samonil et al. | 188/282.3 |

(Continued)

FOREIGN PATENT DOCUMENTS

| | | |
|---|---|---|
| EP | 0 748 950 A1 | 12/1996 |
| GB | 2 412 954 A | 10/2005 |

(Continued)

OTHER PUBLICATIONS

Official communication issued in the International Application No. PCT/JP2006/317776, mailed on Nov. 7, 2006.

(Continued)

*Primary Examiner* — Bradley King
*Assistant Examiner* — Nicholas J Lane
(74) *Attorney, Agent, or Firm* — Keating & Bennett, LLP

(57) ABSTRACT

In a shock absorber of a vehicle, when a moving speed of a piston rod in relation to a cylinder tube is slow and first and second input forces are externally applied to the shock absorber, damping forces of pressure side and extension side first damping force generating devices are larger than that of pressure side and extension side second damping force generating devices. On the other hand, when the moving speed is fast, the damping forces of the pressure side and the extension side second damping force generating devices are larger than that of the pressure side and the extension side first damping force generating devices. A gas enclosure chamber filled with gas is connected to a first chamber through a free piston.

11 Claims, 8 Drawing Sheets

U.S. PATENT DOCUMENTS

| | | | |
|---|---|---|---|
| 5,810,128 A | | 9/1998 | Eriksson et al. |
| 5,823,306 A | * | 10/1998 | de Molina ............... 188/322.15 |
| 5,971,117 A | * | 10/1999 | Grundei et al. ............. 188/288 |
| 6,029,958 A | * | 2/2000 | Larsson et al. ............... 267/113 |
| 6,120,049 A | * | 9/2000 | Gonzalez et al. ............ 280/276 |
| 6,352,145 B1 | * | 3/2002 | DeMolina et al. ........... 188/281 |
| 6,681,906 B1 | * | 1/2004 | Sasse ............................ 188/284 |
| 6,776,269 B1 | * | 8/2004 | Schel ............................ 188/287 |
| 2002/0053493 A1 | | 5/2002 | Sintorn et al. |
| 2008/0018035 A1 | * | 1/2008 | Porter et al. ................. 267/218 |
| 2011/0017557 A1 | * | 1/2011 | Nygren et al. ............. 188/282.5 |

FOREIGN PATENT DOCUMENTS

| | | | |
|---|---|---|---|
| JP | | 01-295043 A | 11/1989 |
| JP | | 02-168038 A | 6/1990 |
| JP | | 10-331898 A | 12/1998 |
| WO | | WO-2005/098262 | * 10/2005 |

OTHER PUBLICATIONS

Official Communication issued in corresponding European Patent Application No. 06797636, completed on Nov. 11, 2011.

* cited by examiner

HYDRAULIC SHOCK ABSORBER

BACKGROUND OF THE INVENTION

1. Field of the Invention

The present invention relates to a hydraulic shock absorber in which the damping force characteristics using a bulk modulus of a hydraulic fluid can be obtained more effectively when the moving speed of a piston rod in relation to a cylinder tube is slow as in the initial stage of compression action and extension action, and in a case in which the hydraulic shock absorber repeats the compression action and the extension action by external first and second input forces.

2. Description of the Related Art

A conventional type of hydraulic shock absorber is shown in JP-A-Hei 10-331898. According to this document, the hydraulic shock absorber is slidably inserted in a cylinder tube in the axial direction, and the hydraulic shock absorber includes first and second pistons for dividing the inside of the cylinder tube into a first chamber, an intermediate chamber, and a second chamber from one end to another end in this order; and a piston rod in which one end is connected to the first and the second pistons, and another end protrudes out of the cylinder tube from another end of the cylinder tube.

The shock absorber also includes a first damping force generating device for absorbing a first input force by oil flowing from the first chamber through the first piston to the intermediate chamber, when the first input force is externally applied in order to insert the piston rod deeper into the cylinder tube; and a second damping force generating device for absorbing the first input force by oil flowing from the intermediate chamber through the second piston to the second chamber when the first input force is applied.

The first and second damping force generating devices work concurrently to generate the damping force when the shock absorber is supplied with the external first input force and performs an action to insert the first and the second pistons and piston rods into the cylinder tube, that is, when the shock absorber is in compression.

The shock absorber in the above case has the following damping force characteristics. An increase gradient of the damping force is large when the compression action of the shock absorber is at the initial stage and when the moving speed of the piston rod in relation to the cylinder tube is slow. After this, when the moving speed increases, the damping force becomes higher. However, the increase gradient decreases gradually (see, for example, paragraphs in JP-A-Hei 10-331898).

When a vehicle is driving, at the initial stage of the compression action in which the shock absorber is supplied with the first input force from the driving road surface through the vehicle wheel side, a first orifice and bypass passage that are part of the first and second damping force generating devices work together concurrently and generate the damping force. At this time, the second chamber expands and its hydraulic pressure decreases to lower than that of the intermediate chamber.

In general, a hydraulic fluid used in the shock absorber is a compressible fluid with a characteristic performing a volume change by pressurization or decompression (hereinafter, this is simply referred to as "bulk modulus"). A capacity of the second chamber alone is small, so if compared with an imaginary chamber that has the same pressure value and a larger capacity than the second chamber, the volume change amount of the oil in the second chamber according to the "bulk modulus" is smaller (harder) than that of the imaginary chamber.

Therefore, even at the initial stage of the compression action of the shock absorber, the hydraulic pressure in the second chamber rapidly decreases according to the entering action of the second piston. Following this, the oil flows immediately from the intermediate chamber through the second damping force generating device to the second chamber in order to generate the damping force. In other words, the response of the damping force generation in relation to a time that the external force is applied, which is the first input force applied to the shock absorber, becomes high (hereinafter this is simply referred to as the "response").

Thus, at the initial stage of the compression action of the shock absorber, the driver tends to be given a hard impression, because the response is high. This is not preferable since it fails to improve driving comfort of the vehicle.

On the other hand, when the shock absorber is supplied with an external second input force, then the first and the second pistons, and the piston rods perform an action to extend from the cylinder tube. That is, when the shock absorber is performing such an extension action, the second chamber performs compression at the initial stage, and its hydraulic pressure becomes higher than that of the intermediate chamber.

Here, the capacity of the second chamber alone is small, so the volume change amount by the "bulk modulus" of the oil in this second chamber is small (hard). Therefore, the hydraulic pressure in the second chamber rapidly increases according to the extension action of the second piston, even at the initial stage of the extension action of the shock absorber. Following this, the oil immediately tends to flow from the second chamber through the second damping force generating device to the intermediate chamber. That is, the response becomes higher.

Therefore, a driver tends to be given a hard impression from the vehicle even at the initial stage of the extension action of the shock absorber, and the same problem as mentioned above may occur.

SUMMARY OF THE INVENTION

In order to overcome the problems described above, preferred embodiments of the present invention provide a hydraulic shock absorber in which the response is restrained to be low when the moving speed of the piston rod in relation to the cylinder tube is slow, while the response is high when the first and the second input forces are large and the moving speed is fast in the initial stage during the compression and the extension actions of the hydraulic shock absorber when the external first and the second input forces are applied.

An advantage of the various preferred embodiments of the present invention is that a soft driving feel is provided to a vehicle by mounting the shock absorber to the vehicle, and at the same time, an improved driving feel and driving safety are obtained by absorbing shocks without delay when large external first and second input forces are applied.

The hydraulic shock absorber preferably includes first and second pistons that are inserted in a cylinder tube such that they can slide in the axial direction, and divide the inside of the cylinder tube into a first chamber, an intermediate chamber, and a second chamber from a first end to a second end in this order; a piston rod in which a first end is connected the first and the second pistons, and a second end protrudes outside of the cylinder tube from another end of the cylinder tube; a pressure side first damping force generating device arranged to absorb the first input force by flowing oil from the first chamber through the first piston to the intermediate chamber, when the first input force is externally applied to enter the piston rod into the cylinder tube; a pressure side second damping force generating force arranged to absorb the first input force by flowing oil from the intermediate chamber through the second piston to the second chamber when the first input force is applied; an extension side first damping force generating device arranged to absorb the second input force by flowing oil from the intermediate chamber through the first piston to the first chamber when the second input force is externally applied to evacuate the piston rod from the cylinder tube; an extension side second damping force generating device arranged to absorb the second input force by flowing oil from the second chamber through the second piston to the intermediate chamber when the second input force is applied; in which the damping forces of the pressure side and the extension side first damping force generating devices are higher than that of the pressure side and the extension side second damping force generating devices when the moving speed of the piston rod in relation to the cylinder tube is slow, and the damping forces of the pressure side and the extension side second damping force generating devices are higher than that of the pressure side and the extension side first damping force generating devices when the moving speed is fast; and a gas enclosure chamber filled with gas connected to the first chamber through a free piston.

In addition to the above-mentioned features, the pressure side and the extension side first damping force generating devices preferably include pressure side and extension side first valves arranged to pass oil through the first piston by a first hydraulic pressure difference between the first chamber and the intermediate chamber when the first and the second input forces are applied, and a first orifice that passes through the first piston. And the pressure side and the extension side second damping force generating devices preferably include pressure side and extension side second valves arranged to pass oil through the second piston by a second hydraulic pressure difference between the intermediate chamber and the second chamber when the first and the second input forces are applied, and a second orifice that passes through the second piston. Open valve pressure characteristics of the pressure side and the extension side first valves are preferably weaker than that of the pressure side and the extension side second valves. A cross-section of the first orifice is preferably smaller than that of the second orifice.

In addition to the above-mentioned features, a cross-section of the second orifice is preferably about one and one-half to about ten times of a cross-section of the first orifice.

In addition to above-mentioned features, the kinetic viscosity of the oil is preferably about four to about ten centistokes (cSt) at 40° C.

In addition to the above-mentioned features, a regulation device may be provided so that a value of a cross-section of the second orifice is variable.

In addition to the above-mentioned features, an outer diameter of a portion of the piston rod connected to the first piston may be smaller than an outer diameter of other portion of the piston rod connected to the second piston.

In addition to the above-mentioned features, another cylinder tube may be disposed as a separate unit from the cylinder tube, and the free piston may be slidably inserted in the cylinder tube in the axial direction, and one of two chambers in the cylinder tube divided by the free piston may be filled with the oil as an oil storage chamber that is in communication with the first chamber, while the other chamber may be a gas enclosure chamber filled with high pressure gas.

In addition to the above-mentioned features, in the axial direction of the cylinder tube, an intermediate piston slidably inserted in the cylinder tube in the axial direction may be disposed, so as to be located between the first piston and the second piston, and the pressure side and the extension side intermediate damping force generating devices, which have same configuration and same action as the pressure side and the extension side first damping force generating devices or the pressure side and the extension side second damping force generating devices, are disposed on the intermediate piston, and the intermediate piston may be connected to the first end of the piston rod.

In addition to the above-mentioned features, the free piston is preferably slidably inserted in the first chamber in the cylinder tube in the axial direction to define two chambers within the first chamber, and the chamber on the opposite side of the first piston may be the gas enclosure chamber.

In addition to the above-mentioned features, the regulation device may have a needle valve inserted into a through-hole provided on the shaft center of the piston rod, and a cross-section of a portion of the second orifice provided on the shaft center of the piston rod may be variable by the needle valve.

In addition to the above-mentioned features, an outer diameter of a portion of the piston rod connected to the first piston may be smaller than an outer diameter of a portion of the piston rod connected to the second piston.

In addition to the above-mentioned features, the hydraulic shock absorber may be provided in a suspension system of a vehicle, and may be arranged between a vehicle body side of the vehicle and respective vehicle wheel sides suspended from the vehicle body side.

The following advantages and benefits are obtained by the preferred embodiments of the present invention.

The hydraulic shock absorber according to a preferred embodiment of the present invention preferably includes first and second pistons that are slidably inserted in a cylinder tube in the axial direction, and divide the inside of the cylinder tube into a first chamber, an intermediate chamber, and a second chamber from a first end to a second end in this order; a piston rod in which a first end is connected the first and the second pistons, and a second end protrudes outside of the cylinder tube from another end of the cylinder tube; a pressure side first damping force generating device arranged to absorb the first input force by flowing oil from the first chamber through the first piston to the intermediate chamber, when the first input force is externally applied to enter the piston rod into the cylinder tube; a pressure side second damping force generating device arranged to absorb the first input force by flowing oil from the intermediate chamber through the second piston to the second chamber when the first input force is applied; an extension side first damping force generating device arranged to absorb the second input force by flowing oil from the intermediate chamber through the first piston to the first chamber when the second input force is externally applied to evacuate the piston rod from the cylinder tube; an extension side second damping force generating device arranged to absorb the second input force by flowing oil from the second chamber through the second piston to the intermediate chamber; in which the damping forces of the pressure side and the extension side first damping force generating devices are higher than that of the pressure side and the extension side second damping force generating devices when the moving speed of the piston rod in relation to the cylinder tube is slow, and the damping forces of the pressure side and the extension side second damping force generating devices are higher than that of the pressure side and the extension side first damping force generating devices when the moving speed is fast; and a gas enclosure chamber filled with gas connected to the first chamber through a free piston. Therefore, the following action effects and advantages are achieved.

That is, when the hydraulic shock absorber is applied with the first input force and performs a compression action, in general, the oil in the first chamber flows from the first chamber through the pressure side first damping force generating device in the first chamber to the intermediate chamber. Also, the oil in the intermediate chamber flows from the intermediate chamber through the pressure side second damping force generating device in the second piston to the second chamber. In this way, the pressure side first and second damping force generating devices try to generate the damping force concurrently by causing the oil to flow.

In the above case, at the initial stage of the compression action by the shock absorber, the first chamber is compressed, and its hydraulic pressure tries to rise by the entering action of the first and the second pistons and the piston rod into the cylinder tube.

However, as described above, the gas enclosure chamber filled with gas is connected to the first chamber through the free piston. So, when the first chamber is compressed, and its hydraulic pressure starts to rise, the hydraulic pressure rise in the first chamber is restrained by the motion of the free piston and the compression of the gas in the gas enclosure chamber. Therefore, oil is prevented from flowing immediately from the first chamber through the pressure side first damping force generating device to the intermediate chamber and the second chamber by the hydraulic pressure of the first chamber at the initial stage in the compression action of the shock absorber.

Here, as described above, when the moving speed of the piston rod in relation to the cylinder tube is small, the damping force of the pressure side first damping force generating device is larger than that of the pressure side second damping force generating device. Therefore, at the initial stage of the compression action of the shock absorber, when the moving speed is slow, among the pressure side first and second damping force generating devices, the pressure side first damping force generating device predominantly generates the damping force, and the pressure side second damping force generating device barely generates the damping force. Therefore, the intermediate chamber and the second chamber, behind the first and the second pistons working with the piston rod, decrease their pressure concurrently. These pressure decreases are generally the same as each other, so the intermediate chamber and the second chamber function as a united single chamber.

In the above case, a total capacity determined by the sum of the capacity of the intermediate chamber and the second chamber is larger than a single capacity of these chambers, so the volume change amount by the "bulk modulus" of the oil in the intermediate chamber and the second chamber is kept large (soft). Therefore, at the initial stage of the compression action of the shock absorber, even if the first and the second pistons enter into the cylinder tube, the decrease in speed of the hydraulic pressure in the intermediate chamber and the second chamber is restrained to be small. Therefore, oil is prevented from flowing immediately from the first chamber through the pressure side first damping force generating device to the intermediate chamber and the second chamber. In other words, the response is restrained to be low at the initial stage of the compression action of the shock absorber, and is prevented from suddenly restraining the entering of the piston rod into the cylinder tube.

As a result, for example, if the shock absorber is equipped on the vehicle, the vehicle provides a soft impression to a driver at the initial stage of the compression action of the shock absorber when the first input force is applied from the ground when the vehicle is driving. Therefore, an advantageous effect of an improved driving feel on the vehicle is produced.

When the moving speed during the compression action increases, the damping force of the pressure side second damping force generating device becomes larger than that of the pressure side first damping force generating device, then the pressure side second damping force generating device predominantly generates the damping force. Therefore, the second chamber behind the moving direction of the second piston is expanded, and its hydraulic pressure decreases.

Here, the capacity of the second chamber alone is small, so the volume change amount by the "bulk modulus" of the oil in the second chamber is small (hard). Therefore, according to the entering action of the second piston, the decrease in speed of the hydraulic pressure in the second chamber becomes faster, then the response in the pressure side second damping force generating device becomes higher.

As a result, if the shock absorber is equipped on the vehicle, the impact energy based on the impact force applied to the vehicle is immediately absorbed by the pressure side second damping force generating device when the moving speed is fast during the compression action of the shock absorber by the first input force applied from the ground. Therefore, another advantageous effect that is achieved is an improved driving stability of the vehicle.

On the other hand, when the shock absorber is applied with the second input force and performs an extension action, in general, the oil in the second chamber flows from the second chamber through the extension side second damping force generating device in the second piston toward the intermediate chamber. Also, the oil in the intermediate chamber flows from the intermediate chamber through the extension side first damping force generating device in the first piston towards the first chamber. In this way, the extension side first and second damping force generating devices try to generate the damping force concurrently, by flowing the oil respectively in these chambers.

In above case, at the initial stage of the extension action in the shock absorber, the first chamber is expanded, and its hydraulic pressure tries to decrease by the extension action of the first and the second pistons and the piston rod from the cylinder tube.

However, as described above, the gas enclosure chamber filled with gas is connected to the first chamber through the free piston. So, when the first chamber is expanded, and its hydraulic pressure starts to decrease, the hydraulic pressure decrease in the first chamber is restrained by the motion of the free piston and the expansion of the gas in the gas enclosure chamber. Therefore, oil is prevented from flowing immediately from the intermediate chamber and the second chamber through the extension side first damping force generating device toward the first chamber at the initial stage of the extension action of the shock absorber.

Here, as described above, when the moving speed of the piston rod in relation to the cylinder tube is small, the damping force of the extension side first damping force generating device is larger than that of the extension side second damping force generating device. Therefore, at the initial stage of the extension action of the shock absorber, when the moving speed is slow, among the extension side first and second damping force generating devices, the extension side first damping force generating device predominantly generates the damping force, and the extension side second damping force generating device barely generates the damping force. Therefore, the first chamber and the intermediate chamber, behind in the proceeding direction of the first and the second pistons working with the piston rod, decreases its pressure concurrently. These pressure decreases are generally the same, so the intermediate chamber and the second chamber function as a united single chamber.

In the above case, a total capacity of the sum of each capacity of the first chamber and the intermediate chamber is larger than the single capacity of these, so the volume change amount by the "bulk modulus" of the oil in the first chamber and the intermediate chamber is kept large (soft). Therefore, at the initial stage of the extension action of the shock absorber, even if the first and the second pistons extend from the cylinder tube, the increase in speed of the hydraulic pressure in the intermediate chamber and the second chamber is restrained to be small. Therefore, oil is prevented from flowing immediately from the intermediate chamber and the second chamber through the extension side first damping force generating device to the first chamber. In other words, the response is restrained to be low at the initial stage of the extension action of the shock absorber, and is prevented from suddenly restraining the extension of the piston rod from the cylinder tube.

As a result, if the shock absorber is equipped on a vehicle, the vehicle provides a soft impression to a driver at the initial stage of the extension action of the shock absorber when the second input force is applied. Therefore, the driving feel of the vehicle is improved, and the advantageous effects are more reliably achieved.

When the moving speed during the extension action increases, the damping force of the extension side second damping force generating device becomes larger than that of the extension side first damping force generating device, then the extension side second damping force generating device predominantly generates the damping force. Therefore, the second chamber in front of the moving direction of the second piston compresses, and its hydraulic pressure increases.

Here, the capacity of the second chamber alone is small, so the volume change amount by the "bulk modulus" of the oil in the second chamber is small (hard). Therefore, according to the extension action of the second piston, the increase in speed of the hydraulic pressure in the second chamber becomes faster, then the response in the extension side second damping force generating device becomes higher.

As a result, if the shock absorber is equipped on a vehicle, the impact energy based on the second input force is immediately absorbed by the extension side second damping force generating device, when the moving speed is fast during the extension action of the shock absorber by the second input force. Therefore, another advantageous effect is an improved driving stability of the vehicle is more reliably produced.

According to another preferred embodiment of the present invention, the pressure side and the extension side first damping force generating devices may include pressure side and extension side first valves for allowing oil to pass through the first piston by the first hydraulic pressure difference between the first chamber and the intermediate chamber when the first and the second input forces are applied, and may include a first orifice that extends through the first piston. And the pressure side and the extension side second damping force generating devices may include pressure side and extension side second valves for allowing oil to pass through the second piston by the second hydraulic pressure difference between the intermediate chamber and the second chamber when the first and the second input forces are applied, and may include a second orifice that extends through the second piston. The open valve pressure characteristics of the pressure side and the extension side first valves may be lower than that of the pressure side and the extension side second valves. The cross-section of the first orifice may be smaller than that of the second orifice.

By providing the above configuration, at the initial stage of the compression action of the shock absorber, the second chamber is expanded by the entering action of the first and the second pistons into the cylinder tube, and its hydraulic pressure decreases. In order to make up the shortage of oil in the second chamber, generally the same amount of oil flows from the first chamber and intermediate chamber through the first orifice in the first piston and the second orifice in the second piston toward the second chamber. Therefore, the hydraulic pressure in the intermediate chamber decreases in relation to the hydraulic pressure in the first chamber. Also, the hydraulic pressure in the second chamber decreases in relation to the hydraulic pressure in the intermediate chamber.

Here, as described above, the cross-section of the first orifice in the pressure side first damping force generating device of the first piston is smaller than that of the second orifice in the pressure side second damping force generating device of the second piston. Therefore, the first hydraulic pressure difference caused by the first orifice is greater than that of the second hydraulic pressure difference caused by the second orifice.

That is, at the initial stage of the compression action of the shock absorber, when the moving speed is slow, among the pressure side first and second damping force generating devices, the pressure side first damping force generating device predominantly generates the damping force, and the damping force of the pressure side first damping force generating device becomes greater than that of the pressure side second damping force generating device.

The first valve opens when the moving speed during the compression action increases, and the first hydraulic pressure between the hydraulic pressure in the first chamber and the hydraulic pressure in the intermediate chamber reaches the open valve pressure point of the first valve of the pressure side first damping force generating device. Then, the oil in the first chamber flows through the first valve in addition to the first orifice toward the intermediate chamber. Therefore, the increase gradient of the damping force according to this pressure side first damping force generating device is restrained to be small.

As described above, when the flow amount of the oil flowing through the first orifice and the first valve in the pressure side first damping force generating device increases according to an increase in the moving speed, a flow resistance (pressure loss) increases because the oil flows through the second orifice in the pressure side second damping force generating device. Therefore, the damping force of this pressure side second damping force generating device increases.

The second valve opens when the moving speed during the compression action further increases, and a flow amount in the second orifice of the pressure side second damping force generating device increases. The flow resistance increases and the second hydraulic pressure difference between the hydraulic pressure in the intermediate chamber and the hydraulic pressure in the second chamber reaches the open valve pressure point of the second valve of the pressure side second damping force generating device. Then, the oil in the intermediate chamber flows through the second valve in addition to the second orifice toward the second chamber. Therefore, the increase gradient of the damping force according to this pressure side second damping force generating device is restrained to be small.

When the moving speed during the compression action increases, the damping force of the pressure side second damping force generating device becomes greater than the pressure side first damping force generating device, and this pressure side second damping force generating device predominantly generates the damping force.

On the other hand, at the initial stage of the extension action of the shock absorber, the second chamber is compressed by the extension action of the first and the second pistons from the cylinder tube and its hydraulic pressure increases. In order to evacuate the excessive oil in the second chamber, generally the same amount of oil flows from the second chamber through each of the first orifice in the first piston and the second orifice in the second piston toward the first chamber and the intermediate chamber. Therefore, the hydraulic pressure in the intermediate chamber increases in relation to the hydraulic pressure in the first chamber. Also, the hydraulic pressure in the second chamber increases in relation to the hydraulic pressure in the intermediate chamber.

Here, as described above, the cross-section of the first orifice in the extension side first damping force generating device of the first piston is preferably smaller than that of the second orifice in the extension side second damping force generating device of the second piston. Therefore, the first hydraulic pressure difference caused by the first orifice is greater than the second hydraulic pressure difference caused by the second orifice.

That is, at the initial stage of the extension action of the shock absorber, when the moving speed is slow, among the extension side first and second damping force generating devices, the extension side first damping force generating device predominantly generates the damping force, and the damping force of this extension side first damping force generating device becomes greater than that of the extension side second damping force generating device.

The first valve opens when the moving speed during the extension action increases more, and the first hydraulic pressure difference between the hydraulic pressure in the first chamber and the hydraulic pressure in the intermediate chamber reaches the open valve pressure point of the first valve of the extension side first damping force generating device. Then, the oil in the intermediate chamber flows through the first valve in addition to the first orifice toward the first chamber. Therefore, the increase gradient of the damping force according to this extension side first damping force generating device is restrained to be small.

As described above, when the flow amount of the oil flowing through the first orifice and the first valve in the extension side first damping force generating device increases according to an increase in the moving speed, a flow resistance increases because the oil flows through the second orifice in the extension side second damping force generating device. Therefore, the damping force of this pressure side second damping force generating device increases.

The second valve opens when the moving speed during the extension action further increases, and a flow amount in the second orifice of the extension side second damping force generating device increases. The flow resistance increases, and the second hydraulic pressure difference between the hydraulic pressure in the intermediate chamber and the hydraulic pressure in the second chamber reaches the open valve pressure point of the second valve of the extension side second damping force generating device. Then, the oil in the second chamber flows through the second valve in addition to the second orifice toward the intermediate chamber. Therefore, the increase gradient of the damping force according to this extension side second damping force generating device is restrained to be small.

When the moving speed during the extension action increases, the damping force of the extension side second damping force generating device becomes greater than the extension side first damping force generating device, and this extension side second damping force generating device predominantly generates the damping force.

That is, the pressure side and the extension side first and second damping force generating devices are configured by the first and the second valves and the first and the second orifices, and the respective action effect is achieved according to this practical configuration. The configurations of the first and the second valves and first and second orifices are simple, so the respective action effect is achieved by a simple configuration.

In the preferred embodiments described above, a cross-section of the second orifice is preferably about one and one-half to about ten times larger than a cross-section of the first orifice.

Here, if the cross-section of the second orifice is less than about one and one-half times of the cross-section of the first orifice, the value of each cross-section of the first and the second orifices become close to each other. Therefore, when the shock absorber performs a compression action or an extension action by application of the first and the second input forces, at the initial stage in these respective actions, the oil flows in the pressure side first and second damping force generating devices, or in the extension side first and second damping force generating devices generally at the same time and in the same condition, and the shock absorber tends to generate generally the same damping force. Therefore, it is difficult for the pressure side and the extension side first damping force generation devices to predominantly generate the damping force, at the initial stage in the respective action, so the action effect is difficult to obtain.

On the other hand, if the cross-section of the second orifice is more than about ten times of the cross-section of the first orifice, the cross-section of the second orifice becomes too large. Then, the expected damping force is difficult to obtain even if the oil flows through the second orifice. Therefore, it is difficult to obtain the expected damping force especially when the moving speed is fast.

For the above reasons, the diameter of the cross-section of the first orifice with respect to the diameter of the second orifices is preferably between about one and one-half to about ten times.

In the preferred embodiments described above, the kinetic viscosity of the oil is preferably about four to about ten centistokes (cSt) at 40° C.

Accordingly, when the shock absorber is repeatedly used, the temperature of the oil rises and the kinetic viscosity tends to decrease. In general, the decrease of the kinetic viscosity according to the temperature is greater when the kinetic viscosity of the oil is higher.

In general, the kinetic viscosity of the oil is approximately fifteen cSt at 40° C. However, when this type of oil is used, the decrease of the kinetic viscosity becomes greater when the temperature rises, and it becomes difficult to precisely obtain the expected damping force. Also, the positions of the orifices and the damping force generating devices are influenced by the effect (resistance) of the viscosity of the oil in the shock absorber that uses a plurality of pistons as in the preferred embodiments of the present invention. Thus, for decreasing the influence as much as possible, it is beneficial to use a low viscosity oil that has less than about ten cSt viscosities, for example.

On the other hand, when the viscosity of the oil is less than about four, consumption increases and the durability lowers according to a decrease in lubrication in the oil because the viscosity of the oil is too low.

For the reasons described above, the kinetic viscosity of the oil is preferably between about four and about ten cSt at 40° C.

According to another preferred embodiment of the present invention, a regulation device that can change a value of the cross-section of the second orifice may be included.

Accordingly, by controlling the regulation device between a middle and a high-speed range of the moving speed, a desired characteristic can be obtained by variably changing the damping force characteristic of the second orifice.

According to the preferred embodiments described above, an outer diameter of a portion of the piston rod connected to the first piston is preferably smaller than an outer diameter of other portion of the piston rod connected to the second piston.

Accordingly, since the outer diameter of a portion of the piston rod is smaller than the outer diameter of other portions of the piston rod, the effective area at the end surface in the axial direction of the first piston, excluding the through section of the piston rod, can be larger than that of the second piston.

Therefore, the pressure side and the extension side first damping force generating devices can be designed more freely, such that the effective area of the leaf valve body of, for example, a first valve of the pressure side and the extension side first damping force generating devices attached to the first piston can be larger. As a result, when the moving speed is extremely slow, a small value of the damping force generated by the oil flowing through the first valve of the pressure side and the extension side first damping force generating devices can be obtained precisely, and the action effect is improved.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
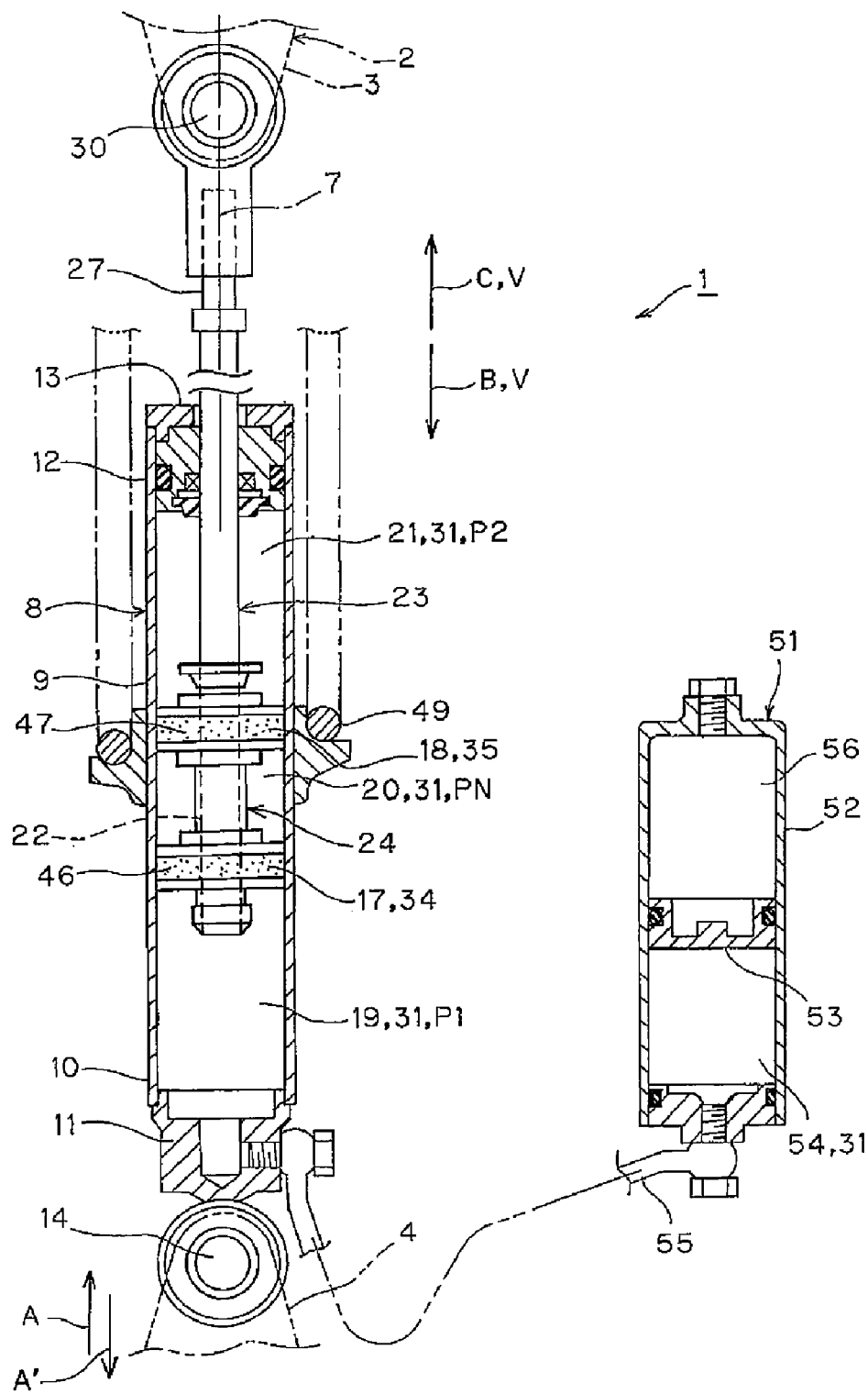
FIG. 1 is a vertical sectional view of a shock absorber according to a first preferred embodiment of the present invention.

Preferred embodiments of the present invention provide a shock absorber that performs compression or extension actions by the application of first and the second external input forces, wherein in the initial stage of the action, when the moving speed of the piston rod in relation to the cylinder tube is slow, the response is restrained to be low, while, when the first and the second input forces are large and the moving speed is fast, the response high. By equipping this shock absorber on a vehicle, the driving feel of the vehicle becomes softer. At the same time, when large first and second input forces are applied, the driving feel of the vehicle is further improved by absorbing the impact without delay. Also, driving stability is improved.

A shock absorber according to a preferred embodiment of the present invention preferably includes first and second pistons which are slidably inserted in a cylinder tube in the axial direction so as to divide the inside of the cylinder tube into a first chamber, an intermediate chamber, and a second chamber, from a first end to a second end in this order; a piston rod having a first end connected to the first and second pistons, and a second end protruding from the second end of the cylinder tube to the outside of the cylinder tube; a pressure side first damping force generating device arranged to absorb the first input force by causing oil to flow from the first chamber through the first piston toward the intermediate chamber when the first input force is externally applied to cause the piston to enter into the cylinder tube; and a pressure side second damping force generating device arranged to absorb the first input force by causing oil to flow from the intermediate chamber through the second piston toward the second chamber when the first input force is applied.

The shock absorber also preferably includes an extension side first damping force generating device arranged to absorb the second input force by causing oil to flow from the intermediate chamber through the first piston to the first chamber when the second input force is externally applied to cause the piston rod to extend from the cylinder tube; and an extension side second damping force generating device arranged to absorb the second input force by causing the oil to flow from the second chamber through the second piston to the intermediate chamber when the second input force is applied.

When the moving speed of the piston rod in relation to the cylinder tube is slow, the damping forces of the pressure side and the extension side first damping force generating devices are greater than that of the pressure side and the extension side second damping force generating devices. When the moving speed is fast, the damping forces of the pressure side and the extension side second damping force generating devices are greater than that of the pressure side and the extension side first damping force generating devices, and a gas enclosure chamber filled with gas is connected to the first chamber through a free piston.

First Preferred Embodiment

Details of the first preferred embodiment will now be described with reference to FIGS. 1 to 3 of the accompanying drawings.

Figure 2:
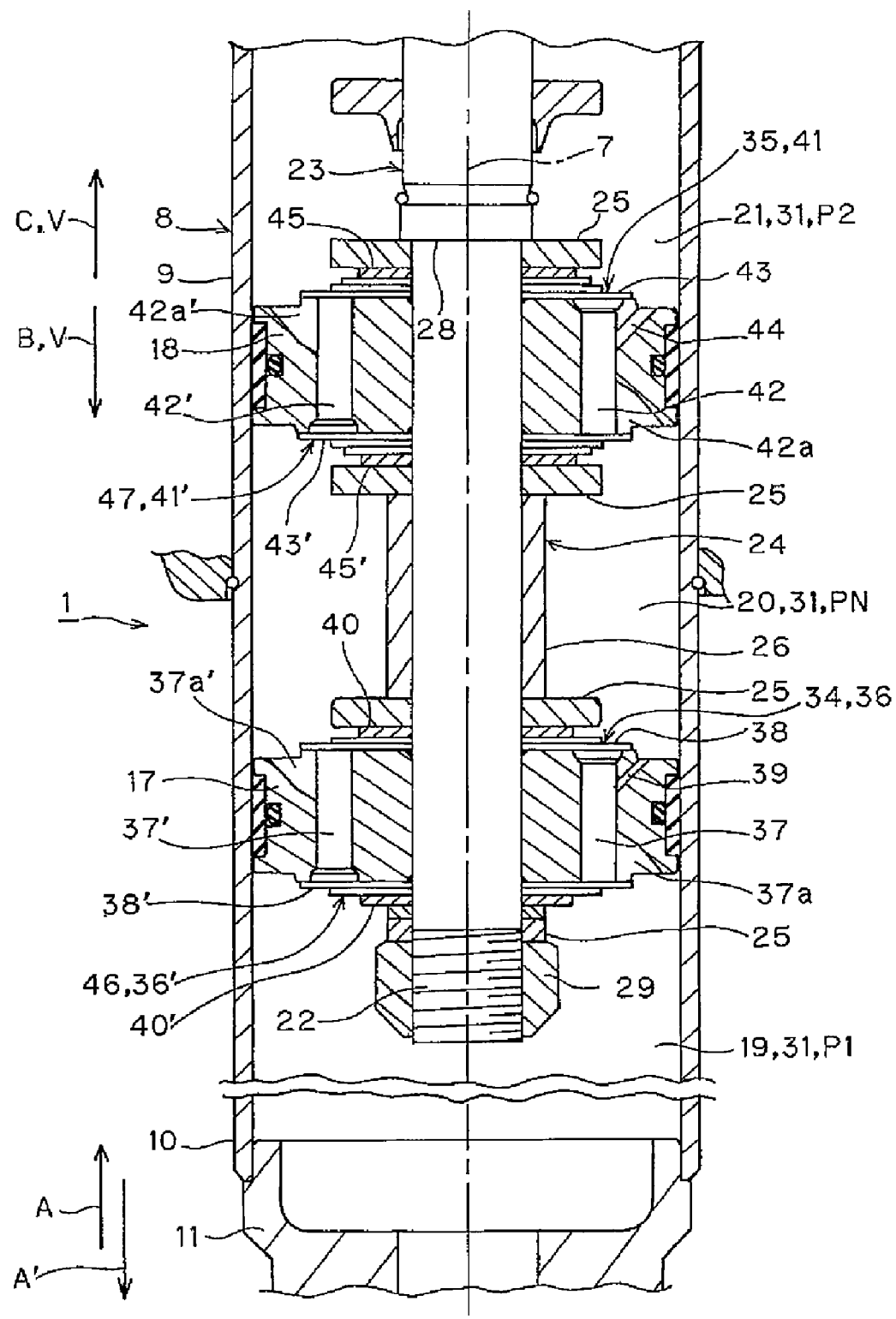
FIG. 2 is a partially enlarged view of the first preferred embodiment shown in FIG. 1.

The reference numeral 1 is a hydraulic shock absorber in FIGS. 1 and 2. The hydraulic shock absorber is preferably used in a suspension device of a vehicle 2, such as an automobile or a motorcycle. The hydraulic shock absorber is provided between a vehicle body side 3 of the vehicle 2 and a vehicle wheel side 4 suspended from the vehicle body side 3.

The hydraulic shock absorber 1 preferably includes a single cylinder type cylinder tube 8 that has a shaft center 7 extending in the longitudinal direction. The cylinder tube 8 includes a tube body 9 located above the shaft center 7, a cap 11 for closing the opening of the lower end of the tube body 9 which corresponds to a first end 10 of the cylinder tube 8, and a head cover 13 for closing the opening of the upper end of the tube body 9 which corresponds to a second end 12 of the cylinder tube 8. The first end 10 of the cylinder tube 8 is pivotally supported by a pivot shaft 14 in relation to the vehicle wheel side 4.

First and second pistons 17, 18 are inserted into the cylinder tube 8 such that they can slide in the axial direction. The first piston 17 is disposed at the first end 10 side of the cylinder tube 8, and the second piston 18 is disposed at the second end 12 side of the cylinder tube 8. The first and the second pistons 17, 18 divide the inside of the cylinder tube 8 into a first chamber 19, an intermediate chamber 20, and a second chamber 21, in respective order, from the first end 10 side to the second end 12 side.

A piston rod 23 is located above the shaft center 7. A first end 22 of the piston rod 23 is connected to the first and the second pistons 17, 18, and a second end 27 protrudes externally from the cylinder tube 8. The first end 22 of the piston rod 23 passes through the center of the first and the second pistons 17, 18. The first and the second pistons 17, 18 are connected to the first end 22 of the piston rod 23 by a coupling device 24.

The coupling device 24 preferably includes a washer 25 that is fitted onto the piston rod 23 to sandwich the first and the second pistons 17, 18; a spacer 26 that is fitted onto the piston rod 23 and disposed between the first and the second pistons 17, 18; and a fastener 29 that fastens the first and the second pistons 17, 18, washer 25, and spacer 26 as a single unit in relation to a stepped surface 28 arranged between the first end 22 and the second end 27 of the piston rod 23. An edge of the second end 27 of the piston rod 23 is pivotally supported by the pivot shaft 30 in relation to the vehicle body side 3. The inside of the cylinder tube 8 is filled with hydraulic fluid, such as oil 31. The kinetic viscosity of the oil 31 is preferably between about four to about ten centistokes (cSt) at a temperature of 40° C.

When a first input force A is applied externally to the shock absorber 1 to cause the piston rod 23 to enter into the cylinder tube 8, in other words when the shock absorber is in a compression action B, a pressure side damping force generating device 34 absorbs the first input force A by causing the oil 31 to flow from the first chamber 19 through the piston 17 toward the intermediate chamber 20. When the first input force A is applied to cause the shock absorber 1 to be in the compression action B, a pressure side second damping force generating device 35 absorbs the first input force A by causing the oil 31 to flow from the intermediate chamber 20 through the second piston 18 toward the second chamber 21.

The pressure side first damping force generating device 34 includes a pressure side first valve 36. A plurality of valve holes 37 that pass through the first piston 17 are provided on the first piston 17 at a certain spacing in the circumferential direction. The valve holes 37 communicate the first chamber 19 with the intermediate chamber 20, respectively. The first valve 36 preferably includes a pressure side leaf valve body 38 that can resiliently open and close the exit side of the valve hole 37. A notch 37a is provided on the entrance side of the valve hole 37. The leaf valve body 38 is defined by a plurality (e.g., two pieces) of disc shaped leaf springs that have different diameters from one another. The leaf valve body 38 is supported on the piston rod 23 between the first piston 17 and the washer 25 of the coupling device 24 through a leaf sheet 40.

When the first input force A is applied to the shock absorber 1, the shock absorber 1 performs the compression action B, the leaf valve body 38 is opened by a first hydraulic pressure difference (P1−PN) between a hydraulic pressure P1 in the first chamber 19 and a hydraulic pressure PN in the intermediate chamber 20. Then the oil 31 flows from the first chamber 19 through the notch 37a and the valve holes 37 toward the intermediate chamber 20. The pressure side first damping force generating device 34 includes a first orifice 39 with a circular cross-section arranged in the first piston 17. The first orifice 39 communicates the first chamber 19 with the intermediate chamber 20 through the valve holes 37 in the first piston 17.

The pressure side second damping force generating device 35 includes a pressure side second valve 41. A plurality of valve holes 42 that pass through the second piston 18 are arranged in the second piston 18 at a certain spacing in the circumferential direction. The valve holes 42 communicate the intermediate chamber 20 with the second chamber 21. The second valve 41 preferably includes a pressure side leaf valve body 43 that can resiliently open and close the exit side of the valve hole 42. A notch 42a is provided at the entrance side of the valve hole 42. The leaf valve body 43 is preferably made of a plurality of disc shaped leaf springs that have different diameters from one another. The leaf valve body 43 is disposed between the second piston 18 and the washer 25 of the coupling device 24 through the leaf sheet 45, and supported on the piston rod 23.

When the first input force A is applied and the shock absorber 1 performs the compression action B, the leaf valve body 43 is opened by a second hydraulic pressure difference (PN−P2) between hydraulic pressure PN in the intermediate chamber 20 and hydraulic pressure P2 in the second chamber 21. Then the oil 31 flows from the intermediate chamber 20 through the notch 42a and the valve holes 42 toward the second chamber 21. The pressure side second damping force generating device 35 includes a second orifice 44 having a substantially circular cross-section provided in the second piston 18. The second orifice 44 communicates the intermediate chamber 20 with the second chamber 21 through the valve holes 42 in the second piston 18.

Figure 3:
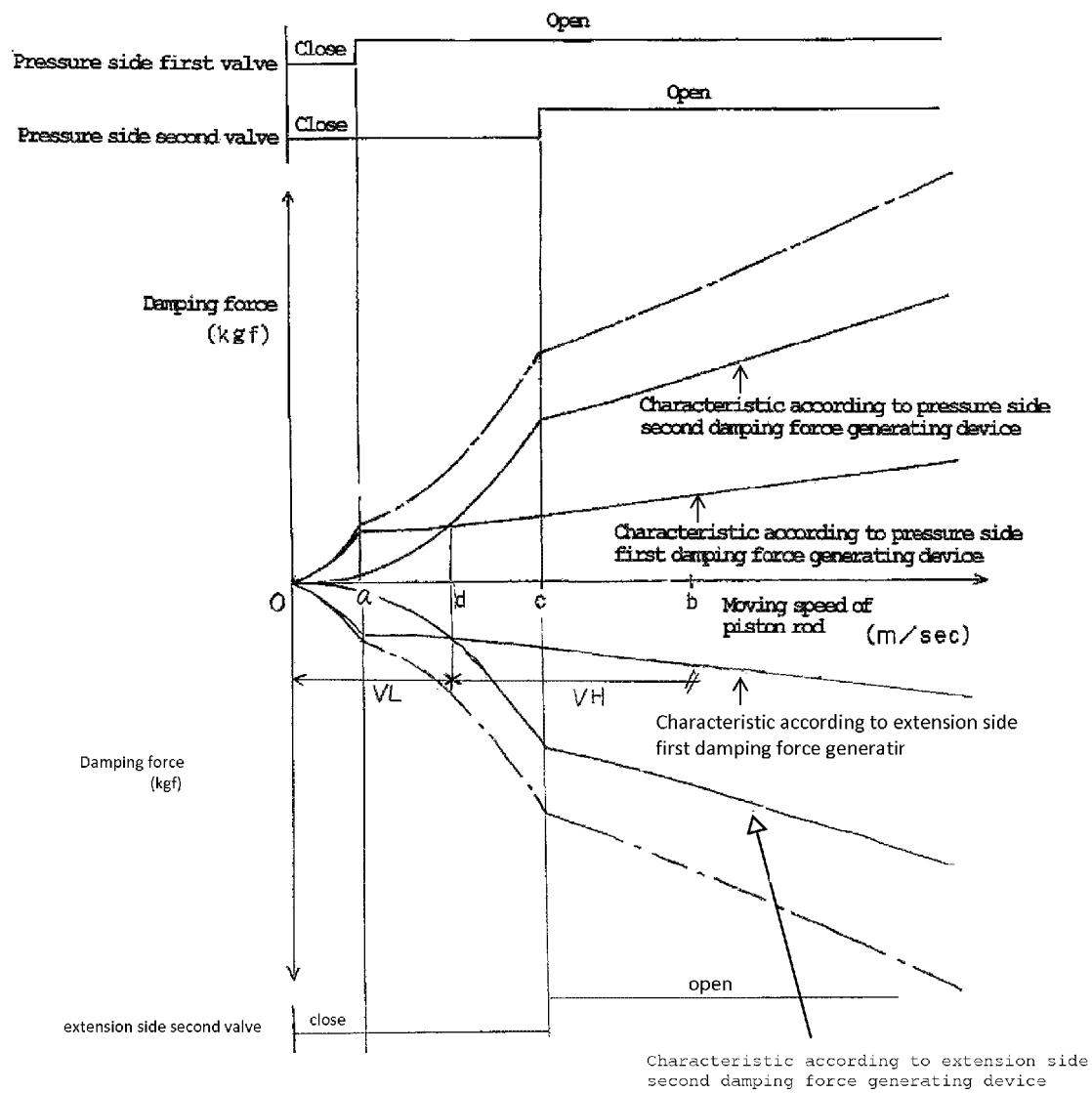
FIG. 3 is a graph showing the relationship between the moving speed of a piston rod and the damping force characteristics.

In FIG. 3, if the moving speed V of the piston rod 23 into the cylinder tube 8 is slow (VL in FIG. 3) when the shock absorber 1 is in the compression action B, the damping force of the pressure side first damping force generating device 34 preferably is larger than that of the pressure side second damping force generating device 35. On the other hand, if the moving speed V is fast (VH in FIG. 3), the damping force of the pressure side second damping force generating device 35 preferably is larger than that of the pressure side first damping force generating device 34.

In order to achieve this, a valve opening pressure characteristic of the first valve 36 is weaker than that of the second valve 41. In other words, a value of the first hydraulic pressure difference (P1−PN) for initiating the valve opening of the first valve 36 of the first piston 17 is smaller than a value of the second hydraulic pressure difference (PN−P2) for initiating the valve opening of the second valve 41 of the second piston 18. A cross-section of the orifice 39 is preferably smaller than a cross-section of the second orifice 44. In this case, the cross-section of the second orifice 44 is about one and one-half times to about ten times larger than the cross-section of the first orifice 39. In the present preferred embodiment, the cross-sections of the first and the second orifices 39, 44 are not adjustable, but rather are fixed to a certain value.

On the other hand, when the second input force A' is applied in the opposite direction of the first input force A, the piston rod 23 extends from the cylinder tube 8. In other words, when the shock absorber 1 performs the extension action C, an extension side first damping force generating device 46 absorbs the second input force A' by causing the oil 31 to flow from the intermediate chamber 20 through the first piston 17 to the first chamber 19. The extension side first damping force generating device 46 includes an extension side first valve 36', valve hole 37', notch 37a', leaf valve body 38', and leaf sheet 40', that are generally the same as those in the pressure side first damping force generating device 34. The first orifice 39 and a portion of the valve holes 37 that communicate therewith are commonly used in the extension side first damping force generating device 46.

When the second input force A' is applied, the shock absorber 1 performs the extension action C, the extension side second damping force generating device 47 absorbs the second input force A' by causing the oil 31 to flow from the second chamber 21 through the second piston 18 to the intermediate chamber 20. The extension side second damping force generating device 47 includes the extension side second valve 41', valve hole 42', notch 42a', leaf valve body 43', and leaf sheet 45', that are generally the same as those in the pressure side second damping force generating device 35. The second orifice 44 and a portion of the valve holes 42 that communicate therewith are commonly used in the extension side second damping force generating device 47.

In the above case, the notch 37a of the pressure side first damping force generating device 34 is not provided around the leaf valve body 38' of the extension side first damping force generating device 46. The notch 37a communicates the valve holes 37 with the first chamber 19. The notch 37a' of the extension side first damping force generating device 46 is not provided around the leaf valve body 38 of the pressure side first damping force generating device 34. The notch 37a' communicates the valve holes 37' with the intermediate chamber 20. On the other hand, notch 42a of the pressure side second damping force generating device 35 is not provided around the leaf valve body 43' of the extension side second damping force generating device 47. The notch 42a communicates the valve holes 42 with the intermediate chamber 20. The notch 42a' of the extension side second damping force generating device 47 is not provided around the leaf valve body 43 of the pressure side second damping force generating device 35. The notch 42a' communicates the valve holes 42' with the second chamber 21. In the respective figures, the leaf valve body is shown in cross-section, however, hatching is not used for convenience.

A spring 49 is arranged between the vehicle body side 3 and the cylinder tube 8 for applying a force in order to extend the shock absorber 1. The application force of the spring 49 is preferably equivalent to the second input force A'.

An accumulator 51 is arranged to constantly pressurize the oil 31 in the first chamber 19, the intermediate chamber 20, and the second chamber 21. In the present preferred embodiment, the accumulator 51 is disposed as a separate unit from the cylinder tube 8. The accumulator 51 preferably includes another cylinder tube 52 supported on the vehicle body side 3, a free piston 53 slidably inserted in the cylinder tube 52 in the axial direction, and a tube 55 for communicating an oil storage chamber 54 with the first chamber 19. The oil storage chamber 54 is one of two chambers in the cylinder tube 52 that is divided by the free piston 53. The oil storage chamber 54 is filled with oil 31. A gas enclosure chamber 56 that corresponds to the other chamber in the cylinder tube 52 is filled with a high-pressure nitrogen gas. The nitrogen gas is compressible, and is in a compressed form in this case. In other words, the gas enclosure chamber 56 is in communication with the first chamber 19 through the free piston 53.

While the vehicle 2 is driving, the shock absorber 1 performs the compression action B when the first input force A is externally applied from the driving road through the vehicle wheel side 4. At this time, the oil 31 in the first chamber 19 flows from the first chamber 19 through the pressure side first damping force generating device 34 in the first piston 17 toward the intermediate chamber 20. Furthermore, the oil 31 in the intermediate chamber 20 flows from the intermediate chamber 20 through the pressure side second damping force generating device 35 in the second piston 18 toward the second chamber 21. The pressure side first and second damping force generating devices 34, 35 attempt to coordinate the damping forces by respectively causing the oil 31 to flow therebetween.

In the above case, at the initial stage of the compression action B by the shock absorber 1, the first chamber 19 is compressed by the entering action of the first and the second pistons 17, 18 and the piston rod 23 into the cylinder tube 8 thereby attempting to cause the hydraulic pressure in the first chamber 19 to rise.

However, as described above, the gas enclosure chamber 56 filled with gas is connected to the first chamber 19 through the free piston 53. Thus, when the first chamber 19 is compressed and its hydraulic pressure P1 begins to rise, the hydraulic pressure in the first chamber 19 is restrained from rising by the motion of the free piston 53 and the compression of the gas in the gas enclosure chamber 56. Therefore, the oil 31 is prevented from immediately flowing in the pressure side first damping force generating device 34 from the first chamber 19 toward the intermediate chamber 20 and the second chamber 21 by the hydraulic pressure P1 in the first chamber 19.

At the initial stage of the compression action B of the shock absorber 1, the second chamber 21 is expanded by the entering action of the first and the second pistons 17, 18 into the cylinder tube 8, and its hydraulic pressure P2 is decreased. In order to make up the shortage of the oil 31 in the second chamber 21, generally the same amount of oil 31 flows from the first chamber 19 and the intermediate chamber 20 through the first orifice 39 in the first piston 17 and the second orifice 44 in the second piston 18 toward the second chamber 21. Thus, the hydraulic pressure PN in the intermediate chamber 20 decreases in relation to the hydraulic pressure P1 in the first chamber 19. At the same time, the hydraulic pressure P2 decreases in relation to the hydraulic pressure PN in the intermediate chamber 20.

Furthermore, as described above, the cross-section of the first orifice 39 in the pressure side first damping force generating device 34 in the first piston 17 is preferably smaller than that of the second orifice 44 in the pressure side second damping force generating device 35 in the second piston 18. Therefore, the first hydraulic pressure difference (P1−PN) caused by the first orifice 39 is larger than the second hydraulic pressure difference (PN−P2) caused by the second orifice 44.

That is, when the shock absorber 1 is in the initial stage of the compression action B, and when the moving speed V is slow (O-a in FIG. 3), the pressure side first damping force generating device 34 among the pressure side first and second damping force generating devices 34, 35, predominantly generates the damping force. Then the damping force in the pressure side first damping force generating device 34 becomes larger than that of the pressure side second damping force generating device 35.

When the shock absorber 1 is in the compression action B, the capacity of the cylinder tube 8 decreases by an amount that the piston rod 23 enters into the cylinder tube 8. Accordingly, the amount of oil equivalent to the decreased capacity flows from the first chamber 19 through the tube 55 into the oil storage chamber 54 by the motion of the free piston 53 in the accumulator 51 and the compression of the gas in the gas enclosure chamber 56. Therefore, the compression action B of the shock absorber 1 is performed smoothly.

If the moving speed V of the compression action B increases further and the first hydraulic pressure difference (P1−PN) between the hydraulic pressure P1 in the first chamber 19 and the hydraulic pressure PN in the intermediate chamber 20 reach the open valve pressure, the first valve 36 opens ("a" in FIG. 3). The oil 31 in the first chamber 19 flows through the first valve 36 in addition to the first orifice 39 toward the intermediate chamber 20. Thus, the increase gradient of the damping force according to the pressure side first damping force generating device 34 is lowered ("a-b" in FIG. 3). The opening of the first valve 36 becomes larger when the first hydraulic pressure difference (P1−PN) is larger.

As described above, when the amount of the oil 31 flowing through the first orifice 39 and the first valve 36 in the pressure side first damping force generating device 34 is increased according to an increase in the moving speed V, a flow resistance increases because the oil 31 flows through the second orifice 44 in the pressure side second damping force generating device 35. Therefore, the damping force of the pressure side second damping force generating device 35 increases ("a-c" in FIG. 3).

As the moving speed V during the compression action B increases ("d" in FIG. 3), the damping force of the pressure side second damping force generating device 35 crosses the value of that of the damping force of the pressure side first damping force generating device 34. While the moving speed V is slow, i.e., up until the crossing point (0−d=VL in FIG. 3), the damping force of the pressure side first damping force generating device 34 is larger than that of the pressure side second damping force generating device 35. However, when the moving speed V is faster ("d-b" in FIG. 3), i.e., after this crossing point, the damping force of the pressure side second damping force 35 becomes larger than that of the pressure side first damping force generating device 34.

The second valve 41 opens ("c" in FIG. 3) when the moving speed V in the compression action B further increases, and the flow amount in the second orifice 44 in the pressure side second damping force generating device 35 increases. Thus, the flow resistance increases, and the second hydraulic pressure difference (PN−P2) between the hydraulic pressure PN of the intermediate chamber 20 and the hydraulic pressure P2 of the second chamber 21 reaches the open valve pressure point of the second valve 41 of the pressure side second damping force generating device 35. The oil 31 in the intermediate chamber 20 flows through the second valve 41 in addition to the second orifice 44 toward the second chamber 21. Thus, the increase gradient of the damping force by the pressure side second damping force generating device 35 is lowered ("c-b" in FIG. 3). The opening of the second valve 41 becomes larger as the second hydraulic pressure difference (PN−P2) becomes larger.

A sum of each damping force of the pressure side first damping force generating device 34 and the pressure side second damping force generating device 35 at each point of the moving speed V during the compression action B is defined as the pressure side damping force characteristic (dashed line in FIG. 3) of the shock absorber 1.

As described above, while the moving speed V of the piston rod 23 in relation to the cylinder tube 8 is slow (VL in FIG. 3), as in the initial stage of the compression action B of the shock absorber 1, the pressure side first damping force generating device 34 predominantly generates the damping force, while the pressure side second damping force generating device 35 barely generates the damping force. Therefore, the intermediate chamber 20 and the second chamber 21 behind the moving direction of the first and the second pistons 17, 18 that move with the piston rod 23 decrease their hydraulic pressure PN, P2 concurrently. The decreasing pressure in each chamber is generally the same. Thus, the intermediate chamber 20 and the second chamber 21 function as a single unit.

In the above case, the capacity of the intermediate chamber 20 and the second chamber 21 together is larger than the capacity of each single chamber. Then the amount of the volume change by the "bulk modulus" of the oil 31 in the intermediate chamber 20 and the second chamber 21 is maintained large (soft). Therefore, the decrease in speed of the hydraulic pressure PN, P2 is kept small. Therefore, immediate flow of the oil 31 in the pressure side first damping force generating device 34 from the first chamber 19 through the pressure side first damping force generating device 34 toward the intermediate 20 and the second chamber 21 is prevented. That is, the response is kept low at the initial stage of the compression action B of the shock absorber 1, and the sudden regulation of the piston rod 23 entering into the cylinder tube 8 is prevented.

As a result, if the shock absorber 1 is equipped on the vehicle 2, the vehicle 2 provides a soft impression to a driver at the initial stage of the compression action B of the shock absorber 1 when the first input force A is applied from the ground. Therefore, an improved driving feel of the vehicle 2 is produced.

When the moving speed V during the compression action B increases, the damping force of the pressure side second damping force generating device 35 becomes larger than that of the pressure side first damping force generating device 34, and the pressure side second damping force generating device 35 predominantly generates the damping force. Therefore, the second chamber 21 behind the moving direction of the second piston 18 becomes larger, and its hydraulic pressure P2 decreases.

The capacity of the second chamber 21 alone is small. So the amount of the volume change by the "bulk modulus" of the oil 31 in the second chamber 21 is small (hard). Therefore, according to the entering action of the second piston 18, the decrease in speed of the hydraulic pressure P2 of the second chamber 21 becomes faster, and the response in the pressure side second damping force generating device 35 becomes higher.

As a result, if the shock absorber 1 is equipped on the vehicle 2, the impact energy based on the first input force A applied to the vehicle 2 is immediately absorbed by the pressure side second damping force generating device 35 when the moving speed V is fast during the compression action B of the shock absorber 1. Therefore, improved driving stability of the vehicle 2 is produced.

When the compression action B of the shock absorber 1 progresses, the application force of the spring 49 increases by as much. When the first input force A is equivalent to the application force of the spring 49, the compression action B of the shock absorber 1 is finished. Then, the applying force of the spring 49, that is, the second input force A' causes the shock absorber 1 to perform an extension action C to return to its original length.

As described above, when the shock absorber 1 is applied with second input force A' that is an application force of the spring 49 and performs the extension action C, the oil 31 in the second chamber 21 flows from the second chamber 21 through the extension side second damping force generating device 47 in the second piston 18 toward the intermediate chamber 20. Also, the oil 31 in the intermediate chamber 20 flows from the intermediate chamber 20 through the extension side first damping force generating device 46 in the first piston 17 toward the first chamber 19. In this way, the extension side first and second damping force generating devices 46, 47 try to coordinate the damping forces by causing the oil 31 to flow, respectively.

In the above case, at the initial stage of the extension action C of the shock absorber 1, the first chamber 19 is expanded by the extension action of the first and the second pistons 17, 18 and the piston rod 23 from the cylinder tube 8, and the hydraulic pressure P1 in the first chamber 19 tries to decrease.

However, as described above, the gas enclosure chamber 56 filled with gas is connected to the first chamber 19 through the free piston 53. Thus, when the first chamber 19 expands and its hydraulic pressure P1 begins to decrease, the hydraulic pressure P1 in the first chamber 19 is restrained from decreasing by the motion of the free piston 53 and the expansion of the gas in the gas enclosure chamber 56. Therefore, the oil 31 is prevented from immediately flowing from the intermediate chamber 20 and the second chamber 21 through the extension side first damping force generating device 46 toward the first chamber 19 by the hydraulic pressure P1 in the first chamber 19.

At the initiation of the extension action C of the shock absorber 1, the second chamber 21 is compressed by the extension action of the first and the second pistons 17, 18 from the cylinder tube 8, and its hydraulic pressure P2 is increased. In order to discharge the excessive oil in the second chamber 21, generally the same amount of oil flows from the second chamber 21 through the orifice 39 in the first piston 17 and through the second orifice 44 in the second piston 18 toward the first chamber 19 and the intermediate chamber 20. Thus, the hydraulic pressure PN in the intermediate chamber 20 increases in relation to the hydraulic pressure P1 in the first chamber 19. At the same time, the hydraulic pressure P2 increases in relation to the hydraulic pressure PN in the intermediate chamber 20.

Furthermore, as described above, the cross-section of the first orifice 39 in the extension side first damping force generating device 46 in the first piston 17 is preferably smaller than that of the second orifice 44 in the extension side second damping force generating device 47 in the second piston 18. Therefore, the first hydraulic pressure difference (PN−P1) caused by the first orifice 39 is larger than the second hydraulic pressure difference (P2−PN) caused by the orifice 44.

Here, the action of the shock absorber 1 during the extension action C, in FIG. 3, is similar to the mirror image of the compression action B about the horizontal axis, which indicates that the damping force is zero. With reference to FIG. 3, the action of the shock absorber 1 at the extension action C is explained.

When the shock absorber 1 is in the initial stage of the extension action C, and when the moving speed V is slow (O-a in FIG. 3), the extension side first damping force generating device 46 among the extension side first and second damping force generating devices 46, 47 predominantly generates the damping force, and the damping force in the extension side first damping force generating device 46 becomes larger than that of the extension side second damping force generating device 47.

When the shock absorber 1 is in the extension action C, the capacity of the cylinder tube 8 increases by as much as the piston rod 23 extends from the cylinder tube 8. In this case, the amount of oil equivalent to the increased capacity flows from the oil storage chamber 54 through the tube 55 into the first chamber 19 by the motion of the free piston 53 in the accumulator 51 and by the expansion of gas in the gas enclosure chamber 56. Therefore, the extension action C of the shock absorber 1 is performed smoothly.

When the moving speed V during the extension action C increases and when the first hydraulic pressure difference (PN−P1) between the hydraulic pressure P1 in the first chamber 19 and the hydraulic pressure PN in the intermediate chamber 20 reaches the open valve pressure point of the first valve 36' in the extension side first damping force generating device 46, the first valve 36' opens ("a" in FIG. 3). The oil 31 in the intermediate chamber 20 flows through the valve 36' in addition to the first orifice 39 toward the first chamber 19. Thus, the increase gradient of the damping force by the extension side first damping force generating device 46 is lowered ("a-b" in FIG. 3). The opening of the first valve 36' becomes larger as the first hydraulic pressure difference (PN−P1) becomes larger.

As described above, when the amount of the oil 31 flowing through the first orifice 39 and the first valve 36' in the extension side first damping force generating device 46 is increased according to an increase in the moving speed V, a flow resistance increases because the oil 31 flows through the second orifice 44 in the extension side second damping force generating device 47. Therefore, the damping force of this pressure side second damping force generating device 35 increases ("a-c" in FIG. 3).

In the middle, as the moving speed V during the extension action C increases ("d" in FIG. 3), the damping force of the extension side second damping force generating device crosses value of that of the damping force of the extension side first damping force generating device 46. While the moving speed V is slow, i.e., up until the crossing point (0−d=VL in FIG. 3), the damping force of the extension side first damping force generating device 46 is larger than that of the extension side second damping force generating device 47. However, when the moving speed V of the extension side second damping force generating device is faster ("d−b=VH" in FIG. 3), the damping force of the extension side second damping force 47 becomes larger than that of the extension side first damping force generating device 46.

The second valve 41' opens ("c" in FIG. 3) when the moving speed V during the extension action C is further increased, and the flow amount of oil 31 in the second orifice 44 in the extension side second damping force generating device 47 increases, its flow resistance increases, and the second hydraulic pressure difference (P2−PN) between the hydraulic pressure PN of the intermediate chamber 20 and the hydraulic pressure P2 of the second chamber 21 reaches the open valve pressure point of the second valve 41' of the extension side second damping force generating device 47. The oil 31 in the second chamber 21 flows through the second valve 41' in addition to the second orifice 44 toward the intermediate chamber 20. Thus, the increase gradient of the damping force by the extension side second damping force generating device 47 is lowered ("c-b" in FIG. 3). The opening of the second valve 41' becomes larger as the second hydraulic pressure difference (P2−PN) becomes larger.

A sum of each damping force of the extension side first damping force generating device 46 and the extension side second damping force generating device 47 at each point of the moving speed V during the extension action C is defined as the extension side damping force characteristic (dashed line in FIG. 3).

As described above, when the moving speed V of the piston rod 23 in relation to the cylinder tube 8 is slow (VL in FIG. 3), the damping force of the extension side first damping force generating device 46 is larger than that of the extension side second damping force generating device 47. Therefore, when the moving speed V is slow as in the initial stage during the extension action C of the shock absorber 1, the extension side first damping force generating device 46 among the extension side first and second damping force generating devices 46, 47 predominantly generates the damping force, and the extension side second damping force generating device 47 barely generates the damping force. Therefore, the first chamber 19 and the intermediate chamber 20, behind the moving direction of the first and the second pistons 17, 18 in communication with the piston rod 23, decrease their hydraulic pressure PI, PN. The pressure decrease in these chambers is generally the same, so the first chamber 19 and the intermediate chamber 20 function as a single chamber.

In the above case, the capacity of the first chamber 19 and the intermediate chamber 20 together is larger than the capacity of each single chamber. Then the volume change amount by the "bulk modulus" of the oil 31 in the first chamber 19 and the intermediate chamber 20 is maintained large (soft). Therefore, the increase in speed of the hydraulic pressure PN, P2 in the intermediate chamber 20 and the second chamber 21 is kept small. Therefore, immediate flow of the oil 31 from the intermediate chamber 20 and the second chamber 21 through the extension side first damping force generating device 46 toward the first chamber 19 is prevented. That is, the response is kept low at the initial stage of the extension action C of the shock absorber 1, and the sudden regulation of the piston rod 23 extending from the cylinder tube 8 is prevented.

As a result, if the shock absorber 1 is equipped on the vehicle 2, it provides a soft impression to a driver at the initial stage of the extension action C of the shock absorber 1 when the second input force A' is applied from the spring 49. Therefore, an improved driving feel of the vehicle 2 is more securely produced.

When the moving speed V during the extension action C increases, the damping force of the extension side second damping force generating device 47 becomes larger than the extension side first damping force generating device 46, then the extension side second damping force generating device 47 predominantly generates the damping force. Therefore, the second chamber 21 in front of the moving direction of the second piston 18 becomes smaller, and its hydraulic pressure P2 increases.

Here, the capacity of the second chamber 21 alone is small. So the volume change amount by the "bulk modulus" of the oil 31 in the second chamber 21 is small (hard). Therefore, according to the extension action of the second piston 18, the increase in speed of the hydraulic pressure P2 in the second chamber 21 becomes faster, and then the response in the extension side second damping force generating device 47 becomes higher.

As a result, if the shock absorber 1 is equipped on the vehicle 2, the impact energy based on the second input force A' is immediately absorbed by the extension side second damping force generating device 47 when the moving speed V is fast during the extension action C of the shock absorber 1 by the second input force A' applied from the spring 49. Therefore, improved driving stability of the vehicle 2 is more securely produced.

Hereafter, the compression action B and the extension action C are repeated in turns, so that the respective first and second input forces A, A' are absorbed, and the smooth traveling of the vehicle 2 is maintained.

As described above, the cross-section of the second orifice 44 is preferably about one and one-half to about ten times larger than the cross-section of the first orifice 39.

Here, if the cross-section of the second orifice 44 is less than about one and one-half times of the cross-section of the first orifice 39, the cross-sectional values of the first and the second orifices 39, 44 come closer to one another. Therefore, if the shock absorber 1 is in the compression action B or extension action C after being applied with the first and the second input forces A, A', the oil 31 flows in the pressure side first and second damping force generating devices 34, 35, or in the extension side first and second damping force generating devices 46, 47, at generally the same time, under the generally same condition, from the initial stage of the respective actions B, C, and then tend to generate generally the same damping force. Therefore, it is difficult for the pressure side first damping force generating device 34 to generate the damping force predominantly at the initial stage of the respective actions B, C, and the above-described action effect is hard to obtain.

On the other hand, if the cross-section of the second orifice 44 is more than about ten times the cross-section of the first orifice 39, the cross-section of the second orifice 44 becomes too large. Then, the expected damping force becomes difficult to achieve even if the oil 31 flows in the second orifice 44. Therefore, it is even more difficult to achieve the expected damping force when the moving speed V is fast (VH in FIG. 3).

For the above reasons, the relative diameters of the first and the second orifices 39, 44 are preferably defined to be between about one and one-half to about ten times with respect to each other, so that the above-described action effect is more securely obtained. More preferably, the relative diameters are between about two to about four times with respect to each other.

As described above, the kinetic viscosity of the oil 31 is preferably about four to about ten centistokes (cSt) at 40° C.

Here, when the shock absorber 1 is repeatedly used, the temperature of the oil 31 rises, and then the kinetic viscosity tends to decrease. In general, the decrease of the kinetic viscosity according to temperature is greater as the kinetic viscosity of the oil 31 is higher.

In general, the kinetic viscosity of the oil 31 at the temperature of 40° C. is about fifteen cSt. However, the decrease of the kinetic viscosity according to the rising temperature of the oil 31 becomes greater when this type of oil 31 is used. Then it is difficult to obtain the expected damping force of the shock absorber 1. At the same time, as in the above configuration, the positions of the orifices 39, 44 and the damping force generating devices 34, 35, 46, 47 are subjected to the effect (resistance) of the viscosity of the oil 31 for the shock absorber 1 using a plurality of pistons. In order to limit this effect as much as possible, it is advantageous to use a mixture having a viscosity lower than about 10 centistokes.

On the other hand, when the viscosity of the oil 31 is less than about four cSt, consumption increases and the durability lowers according to the decrease of the lubrication in the oil 31 because the viscosity of the oil 31 is too low.

Therefore, as described above, the kinetic viscosity of the oil 31 at the temperature of 40° C. is preferably between about four to about ten cSt so that the action effect is more securely produced. The kinetic viscosity is further preferably between about five and about eight cSt.

The above preferred embodiment is merely an example. The shock absorber 1 may be disposed upside down or horizontally or obliquely. The flow resistance (pressure loss) of the oil 31 in the first orifice 39 may be higher than that of the second orifice 44, by providing the cross-section of the first and the second orifices 39, 44 the same as each other and by providing the length of the first orifice 39 longer than that of the second orifice 44. The first and the second orifices 39, 44 may include a plurality of through holes. The diameter (cross-section) of these through holes may be the same as each other, and the number of through holes in the second orifice 44 may be more than those of the first orifice 39.

The following description relates to the second to sixth preferred embodiments. The following preferred embodiments are common in many points with respect to their configuration and action effects. Therefore, the common elements are indicated by the same reference numerals and their explanation is omitted, and the following description applies mainly for the different elements. The configuration of the respective elements in the respective preferred embodiments may be arranged in various combinations to achieve further benefits and advantages of the present invention.

Second Preferred Embodiment

Figure 4:
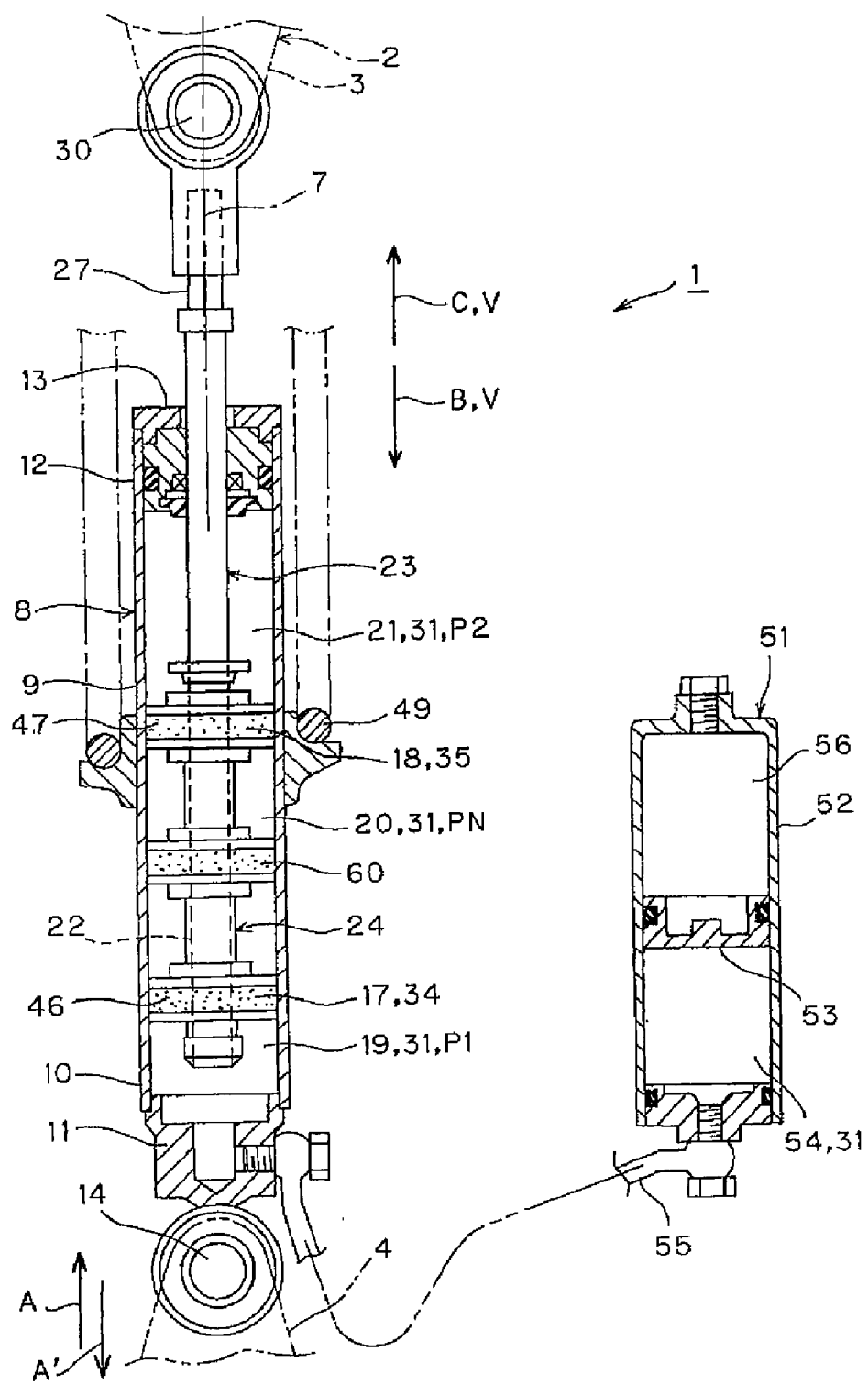
FIG. 4 is a view similar to FIG. 1 showing a second preferred embodiment of the present invention.

A detailed description of the second preferred embodiment of the present invention is now explained with respect to FIG. 4.

In FIG. 4, an intermediate piston 60 is inserted in the cylinder tube 8 such that the intermediate piston 60 can slide in the axial direction. The intermediate piston 60 is disposed between the first and the second pistons 17, 18, and connected to the piston rod 23. The intermediate chamber 20 is divided into two chambers by the intermediate piston 60. Although not shown, the pressure side and the extension side intermediate damping force generating devices, which preferably have the same configuration and effects as the extension side first damping force generating devices 34, 46, and the pressure side and extension side second damping force generating devices 35, 47, are disposed on the pressure side.

In the above case, the intermediate damping force generating device opens a valve according to the value between the first hydraulic pressure difference (P1–PN) and the second hydraulic pressure difference (PN–P2), and causes the oil 31 to flow through the intermediate piston 60. The cross-section of the intermediate damping force generating device is a value between the cross-sections of the respective first and second orifices.

The intermediate piston 60 may include two or more pistons, and the location thereof can be selected freely.

Third Preferred Embodiment

Figure 5:
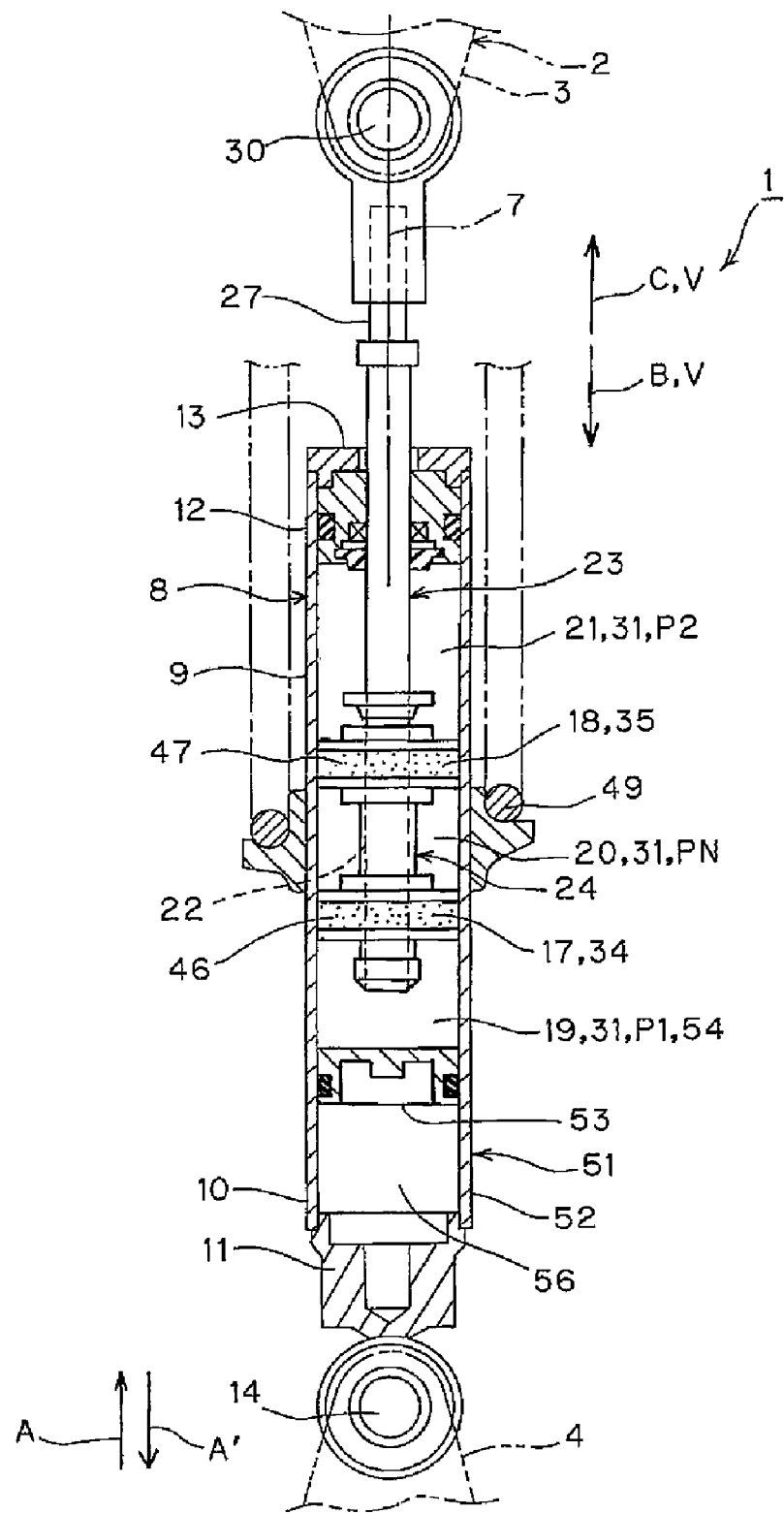
FIG. 5 is a view similar to FIG. 1 showing a third preferred embodiment of the present invention.

A detailed description of the third preferred embodiment of the present invention is now explained with respect to FIG. 5.

In FIG. 5, the accumulator 51 is provided in the cylinder tube 8 as a single unit. Specifically, the free piston 53 is inserted in the first chamber 19 such that the free piston 53 can slide in the axial direction. The first chamber 19 is divided into two chambers by the free piston 53. The high-pressure nitrogen gas is enclosed in the opposite chamber to the first piston 17 with respect to the free piston 53.

The shock absorber 1 can be made more compact according to the present preferred embodiment.

Fourth Preferred Embodiment

Figure 6:
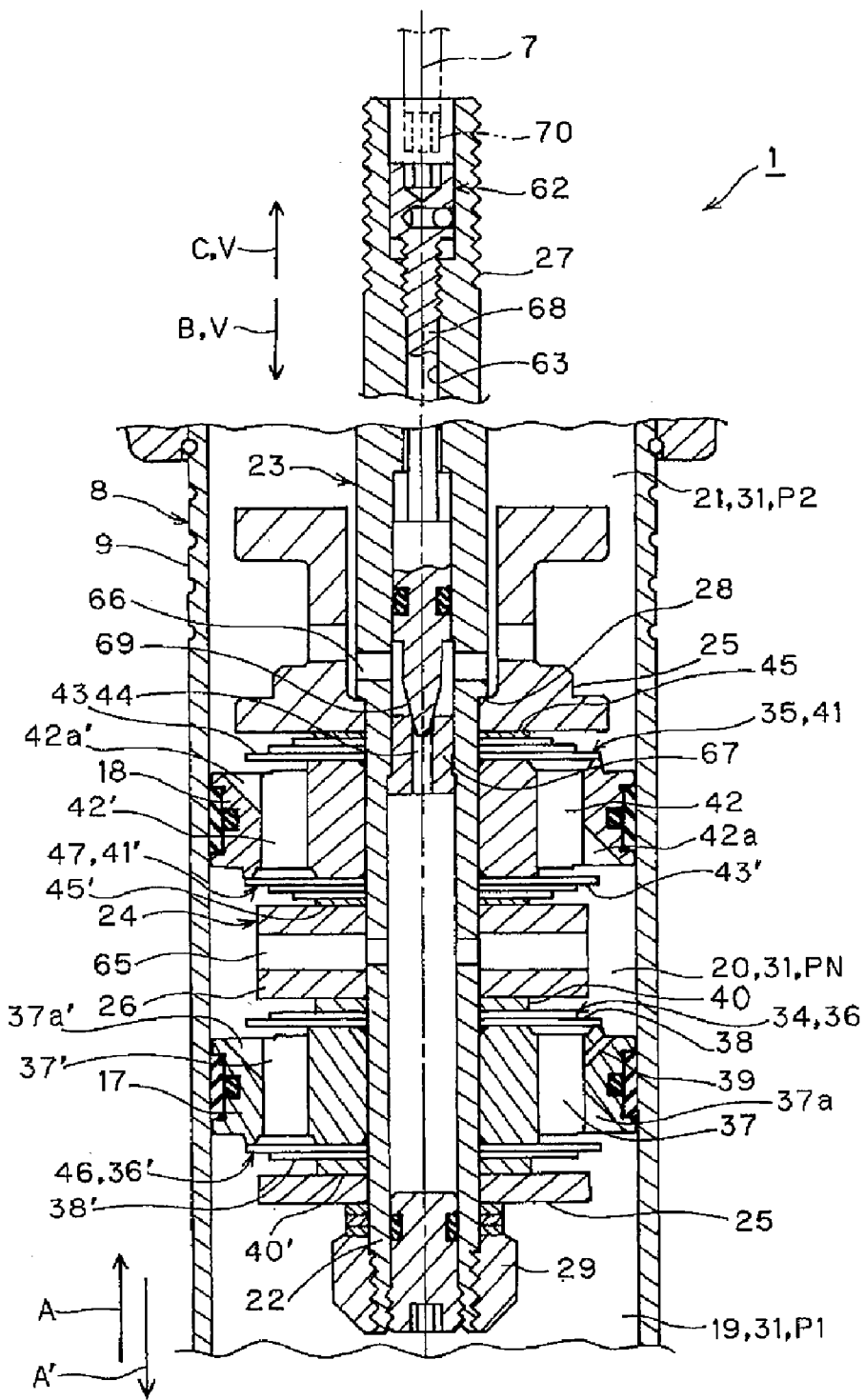
FIG. 6 is a view similar to FIG. 2 showing a fourth preferred embodiment of the present invention.

A detailed description of the fourth preferred embodiment of the present invention is now explained with respect to FIG. 6.

FIG. 6 shows compression state B of the shock absorber 1. The shock absorber 1 is equipped with a regulation device 62 that can change the cross-sectional value of the intermediate, fast speed side second orifice 44 according to the external control from the shock absorber 1. The following describes the regulation device 62.

Through-hole 63 is arranged such that it passes through the piston rod 23 on the shaft center 7. The opening in the first end 10 (lower end) of the through-hole in the tube body 9 is closed. The through-hole 63 is in communication with the intermediate chamber 20 through a passage 65 that is provided in the spacer 26 extending in the longitudinal direction. The through-hole 63 is also in communication with the second chamber 21 through another passage 66 provided in the piston rod 23. A plug 67 is pressed into the through-hole 63 between the passages 65, 66. The second orifice 44 is provided on the shaft center 7 of the plug 67.

An operation bolt 68 is inserted from another end (upper end) of the through-hole 63 and screwed to the piston rod 23. A needle valve 69 is attached as a single unit to the entering end of the operation bolt 68. The needle valve 69 engages against the second orifice 44. When the operation bolt 68 is turned by tool 70, the needle valve 69 moves accordingly, so that the practical cross-sectional value of the second orifice 44 may be changed. The needle valve 69 may be fixed to the piston rod 23 with the operation bolt 68 at the desired turning position.

According to the above configuration, a damping force characteristic of the second orifice 44 may be changed to various values, between the intermediate to fast range in the moving speed V, and thus obtain the required characteristics by controlling the regulation device 62. On the other hand, the cross-section of the first orifices 39 in the pressure side and the extension side first damping force generating devices 34, 46 are fixed and maintained to have a certain value regardless of the control on the regulation device. Therefore, if the shock absorber is equipped on the vehicle 2, a desired driving feel can be obtained while maintaining the action effect.

Fifth Preferred Embodiment

Figure 7:
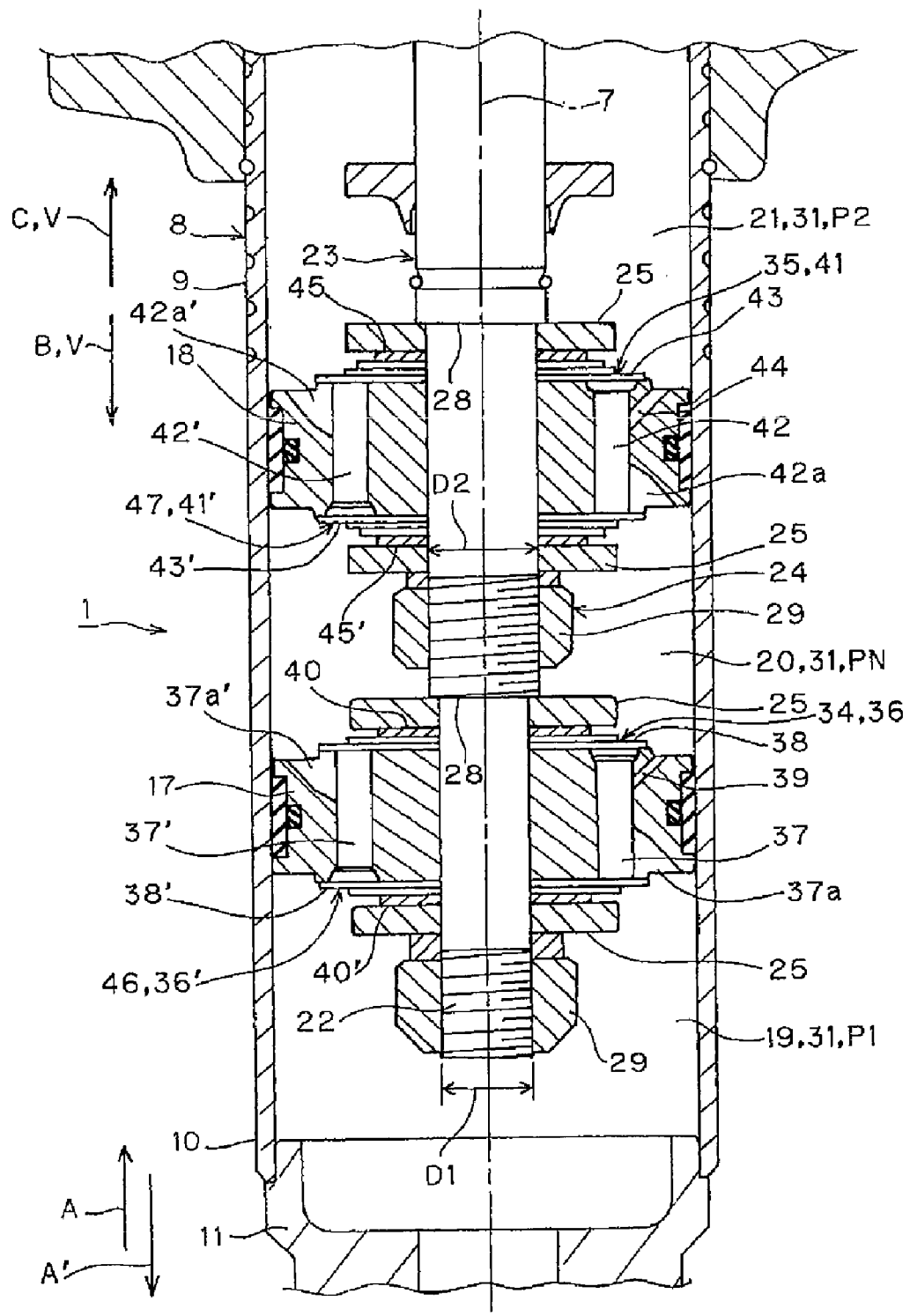
FIG. 7 is a view similar to FIG. 2 showing a fifth preferred embodiment of the present invention.

A detailed description of the fifth preferred embodiment of the present invention is now explained with respect to FIG. 7.

FIG. 7 shows the shock absorber 1 in the compression action B. An outer diameter D1 of a portion of the piston rod 23 connected to the first piston 17 is smaller than an outer diameter D2 of another portion of the piston rod 23 connected to the second piston 18. Second end side 27 of the piston rod 23 is bigger than the outer diameter D2. Therefore, at least two step surfaces 28 are provided on the piston rod 23. The first and the second pistons 17, 18 are fastened individually by fasteners 29 to each step surface 28. Thus, the first and the second pistons 17, 18 are rigidly connected to the piston rod 23.

According to the above configuration, the outer diameter D1 of a portion of the piston rod 23 is smaller than the outer diameter D2 of another portion of the piston rod 23. Thus, the effective area at the end surface in the axial direction of the first piston 17, excluding the through section of the piston rod 23, can be bigger than that of the second piston 18.

Accordingly, flexibility for designing the pressure side and the extension side first damping force generating devices 34, 46 can be improved. For example, the effective surface of the leaf valve bodies 38, 38' of the first valves 36, 36' in the pressure side and the extension side first damping force generating devices 34, 46 attached to the first piston 17 can be bigger. Or, for example, the flexure of the leaf valve bodies 38, 38' can be made more easily and precisely. As a result, a smaller value of the damping force is obtained precisely, which is caused by the flow of the oil 31 through the first valves 36, 36' in the pressure side and the extension side first damping force generating devices 34, 46 when the moving speed V is extremely slow. Therefore, the action effect is further achieved.

Sixth Preferred Embodiment

Figure 8:
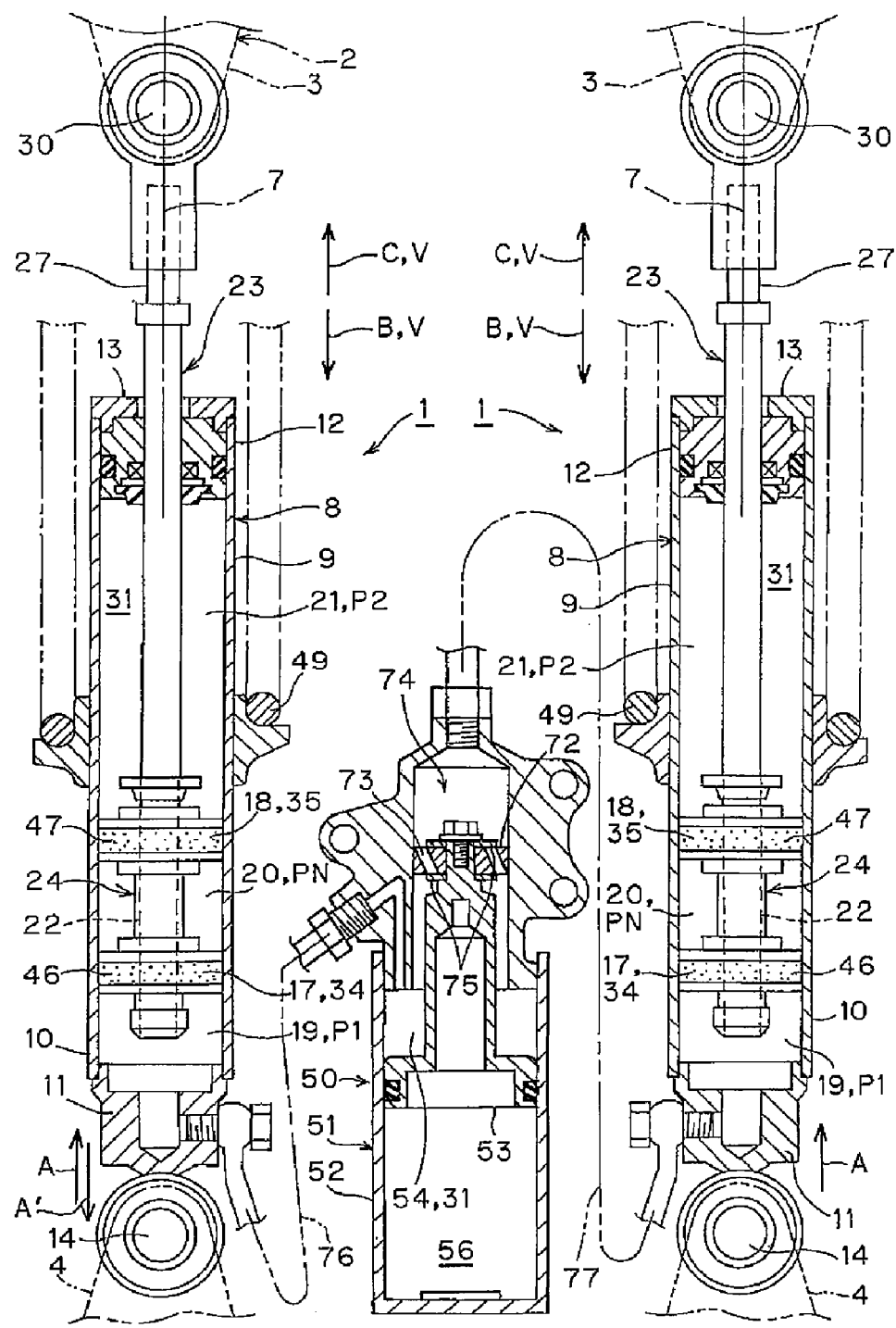
FIG. 8 is a view similar to FIG. 1 showing a sixth preferred embodiment of the present invention.

A detailed description of the sixth preferred embodiment of the present invention is now explained with respect to FIG. 8.

In FIG. 8, a suspension system of the vehicle 2 includes a pair of the shock absorbers 1 and an intermediate unit 50 disposed between the shock absorbers 1. The shock absorbers 1 are respectively arranged between the vehicle body side 3 and each vehicle wheel side 4. In this case, each vehicle wheel side 4 may be a left or right vehicle wheel side, or may be a front or rear vehicle wheel side. The intermediate unit 50 includes an accumulator 51 having another free piston 72 that is slidably inserted in the axial direction in the oil storage chamber 54 of the accumulator 51. The free piston 72 is connected with the free piston 53 and slide as a single unit. The free piston 72 divides the oil storage chamber 54 into two chambers.

A passage 74 communicates the first chambers 19 of the shock absorbers 1 to each other through a narrow section 73. The narrow section 73 is disposed in the free piston 72, and includes a pair of valves 75 that have the same configuration and action as the first valve 36. The valves 75 allow the reverse flow of the oil 31.

The passage 74 is defined by a first tube 76 for communicating between one of the first chambers 19 and one of two chambers in the oil storage chamber 54 divided by the free piston 72, a second tube 77 for communicating between the other one of first chambers 19 and the other one of two chambers in the oil storage chamber 54, and the oil storage chamber 54.

One of the shock absorbers 1 (left side in FIG. 8) performs compression action B by the first input force A. In this case, the oil 31 in the first chamber 19 in the left side shock absorber 1 flows into the lower chamber of the free piston 72 of the oil storage chamber 54 in the accumulator 51 in the intermediate unit 50. Then, the free piston 72 moves downward in reference to the cylinder tube 52 accompanied by the free piston 53, and the capacity of the upper chamber of free piston 72 increases. Then, the oil 31 in the first chamber 19 in the other (right side) shock absorber 1 is drawn into the upper chamber above the free piston 72, and accordingly the right side shock absorber 1 performs the compression action B.

Both shock absorbers 1 perform the same action at the same time so the vehicle 2 is protected against rolling or pitching. At the time when the vehicle 2 has large motions, that is when the moving speed V is fast, the bulk modulus of the oil 31 in the intermediate chamber 20 and the second chamber 21 of the shock absorber 1 is regulated to be low due to the configuration of the present preferred embodiment. Therefore, the precision for an amount of oil 31 flowing in or out in reference to the intermediate unit 50 is improved. Also, the precision for the action effect is improved.

Further preferred embodiments of the present invention can be achieved by matching individual components of the various preferred embodiments described above in various combinations.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A hydraulic shock absorber comprising:
a cylinder tube;
first and second pistons slidably inserted in the cylinder tube in an axial direction, the first and second pistons dividing an inside of the cylinder tube into a first chamber, an intermediate chamber, and a second chamber, in order, from a first end to a second end of the cylinder tube;
a piston rod having a first end connected to the first and second pistons, and a second end externally protruding from the second end of the cylinder tube;
a pressure side first damping force generating device arranged to absorb a first input force by causing oil to flow from the first chamber through the first piston to the intermediate chamber when the first input force is externally applied to cause the piston rod to enter into the cylinder tube;
a pressure side second damping force generating device arranged to absorb the first input force by causing the oil to flow from the intermediate chamber through the second piston to the second chamber when the first input force is applied;
an extension side first damping force generating device arranged to absorb a second input force by causing the oil to flow from the intermediate chamber through the first piston to the first chamber when the second input force is externally applied to cause the piston rod to extend from the cylinder tube;
an extension side second damping force generating device arranged to absorb the second input force by causing the oil to flow from the second chamber through the second piston to the intermediate chamber when the second input force is applied; and
a gas enclosure chamber filled with gas is connected to the first chamber through a free piston; wherein
when a moving speed of the piston rod in relation to the cylinder tube is a first speed, damping forces of the pressure side and the extension side first damping force generating devices are greater than that of the pressure side and the extension side second damping force generating devices;
when the moving speed is a second speed faster than the first speed, the damping forces of the pressure side and the extension side second damping force generating devices are greater than those of the pressure side and the extension side first damping force generating devices;
the pressure side and the extension side first damping force generating devices include a first orifice passing through the first piston, pressure side and extension side first valves arranged to allow the oil to pass through the first piston due to a first hydraulic pressure difference between the first chamber and the intermediate chamber when the first and the second input forces are applied, and the first orifice is arranged to always openly communicate the first chamber with the intermediate chamber;
the pressure side and the extension side second damping force generating devices include a second orifice passing through the second piston, pressure side and extension side second valves arranged to allow the oil to pass through the second piston due to a second hydraulic pressure difference between the intermediate chamber and the second chamber when the first and the second input forces are applied, and the second orifice is arranged to always openly communicate the intermediate chamber with the second chamber;

a pressure at which the pressure side and the extension side first valves open is lower than a pressure at which the pressure side and the extension side second valves open; and a cross-section of the first orifice is smaller than that of the second orifice.

2. The hydraulic shock absorber according to claim 1, wherein a cross-section of the second orifice is about one and one-half to about ten times larger than a cross-section of the first orifice.

3. The hydraulic shock absorber according to claim 1, wherein a kinetic viscosity of the oil is between about four to about ten centistokes at 40° C.

4. The hydraulic shock absorber according to claim 1, further comprising a regulation device arranged to vary a value of the cross-section of the second orifice.

5. The hydraulic shock absorber according to claim 1, wherein an outer diameter of a portion of the piston rod connected to the first piston is smaller than an outer diameter of a portion of the piston rod connected to the second piston.

6. The hydraulic shock absorber according to claim 1, wherein the cylinder tube is a first cylinder tube, the hydraulic shock absorber further comprises a second cylinder tube arranged separate from the first cylinder tube, wherein the free piston is slidably inserted in the second cylinder tube to define the first and second chambers, the first chamber is filled with the oil as an oil storage chamber that communicates with the first chamber, and the second chamber is the gas enclosure chamber.

7. The hydraulic shock absorber according to claim 1, further comprising:

an intermediate piston slidably inserted in the axial direction of the cylinder tube and arranged between the first piston; and pressure side and an extension side intermediate damping force generating devices disposed in the intermediate piston; wherein the intermediate piston is connected to the first end of the piston rod.

8. The hydraulic shock absorber according to claim 1, wherein the free piston is slidably inserted in the first chamber of the cylinder tube to define two chambers within the first chamber, the chamber on the other side of the free piston being the gas enclosure chamber.

9. The hydraulic shock absorber according to claim 4, wherein the regulation device includes a needle valve inserted into a through-hole arranged on a shaft center of the piston rod, the second orifice is arranged on the shaft center, and a cross-section of a portion of the second orifice on the shaft center is variable by movement of the needle valve.

10. The hydraulic shock absorber according to claim 1, wherein an outer diameter of a portion of the piston rod connected to the first piston is smaller than an outer diameter of a portion of the piston rod connected to the second piston.

11. A vehicle including the hydraulic shock absorber according to claim 1, wherein the hydraulic shock absorber is provided on a suspension system of the vehicle between a vehicle body side of the vehicle and a vehicle wheel side suspended from the vehicle body side.

* * * * *